(12) United States Patent
Marzban et al.

(10) Patent No.: US 12,184,569 B2
(45) Date of Patent: Dec. 31, 2024

(54) REFERENCE SIGNAL MULTIPLEXING WITH DOWNLINK DATA

(71) Applicant: QUALCOMM Incorporated, San Diego, CA (US)

(72) Inventors: Mohamed Fouad Ahmed Marzban, San Diego, CA (US); Zhifei Fan, San Diego, CA (US); Hemant Saggar, Irvine, CA (US); Xiaoxia Zhang, San Diego, CA (US); Wooseok Nam, San Diego, CA (US); Jing Sun, San Diego, CA (US); Tao Luo, San Diego, CA (US); Ahmed Abdelaziz Ibrahim Abdelaziz Zewail, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/398,997

(22) Filed: Aug. 10, 2021

(65) Prior Publication Data

US 2022/0329375 A1 Oct. 13, 2022

Related U.S. Application Data

(60) Provisional application No. 63/173,302, filed on Apr. 9, 2021.

(51) Int. Cl.
*H04L 5/00* (2006.01)
*H04L 27/26* (2006.01)

(52) U.S. Cl.
CPC ........ *H04L 5/0048* (2013.01); *H04L 27/2602* (2013.01)

(58) Field of Classification Search
CPC .................... H04L 5/0048; H04L 27/2602
USPC .......................................... 370/329
See application file for complete search history.

(56) References Cited

U.S. PATENT DOCUMENTS

| | | | | |
|---|---|---|---|---|
| 2013/0077660 A1* | 3/2013 | Ko | ...................... | H04L 27/2602 375/219 |
| 2018/0102821 A1* | 4/2018 | Manolakos | .......... | H04B 7/0482 |
| 2019/0312621 A1* | 10/2019 | Nam | .................... | H04L 5/0048 |
| 2019/0349221 A1* | 11/2019 | Jiang | .................... | H04B 7/0626 |
| 2020/0008228 A1* | 1/2020 | Lee | ........................ | H04W 72/21 |
| 2020/0244503 A1* | 7/2020 | Bala | ...................... | H04L 5/0007 |
| 2020/0336256 A1* | 10/2020 | Chen | .................... | H04B 7/0413 |
| 2020/0396047 A1* | 12/2020 | Gao | ...................... | H04L 5/0051 |
| 2021/0258200 A1* | 8/2021 | Lee | ........................ | H04L 5/0051 |

(Continued)

*Primary Examiner* — Xuan Lu
(74) *Attorney, Agent, or Firm* — Procopio, Cory, Hargreaves & Savitch LLP

(57) ABSTRACT

Apparatus, methods, and computer-readable media for facilitating reference signal multiplexing with downlink data are disclosed herein. An example method for wireless communication at a user equipment (UE) includes receiving, from a base station, a reference signal configuration associated with at least one of a tracking reference signal (TRS) and a channel state information reference signal (CSI-RS), the reference signal configuration comprising a symbol level rate matching configuration, a precoder configuration, or a guard tone configuration. The example method also includes receiving, from the base station, a transmission comprising at least a reference signal and data based on the reference signal configuration.

30 Claims, 19 Drawing Sheets

(56) References Cited

U.S. PATENT DOCUMENTS

| | | | |
|---|---|---|---|
| 2021/0298088 A1* | 9/2021 | Qi | H04W 74/0833 |
| 2022/0038234 A1* | 2/2022 | Frenne | H04L 5/0048 |
| 2022/0201734 A1* | 6/2022 | Kim | H04W 72/23 |
| 2023/0054308 A1* | 2/2023 | Yang | H04L 5/0048 |

* cited by examiner

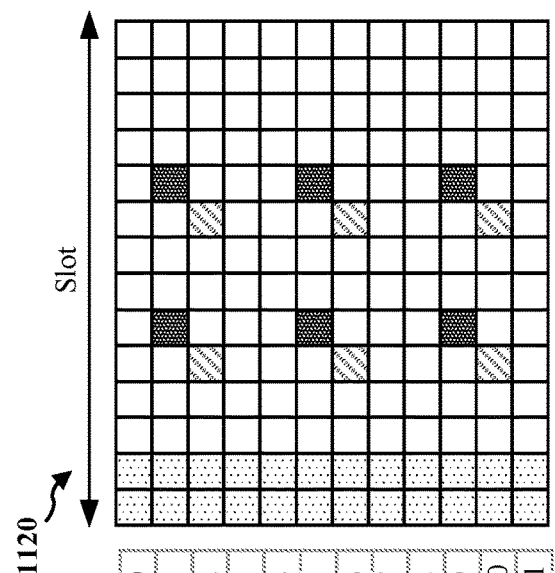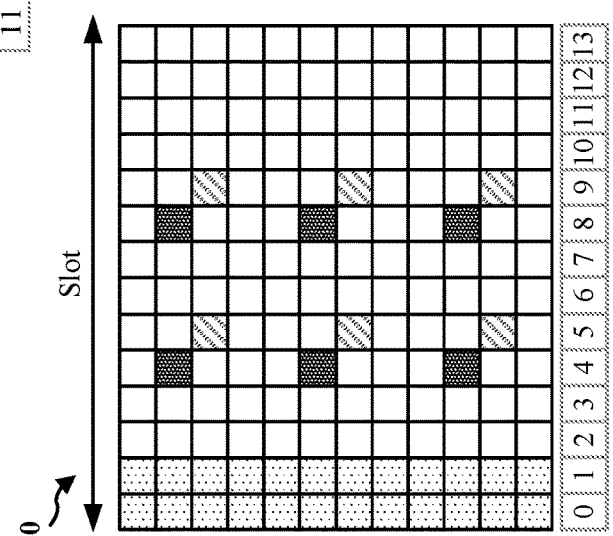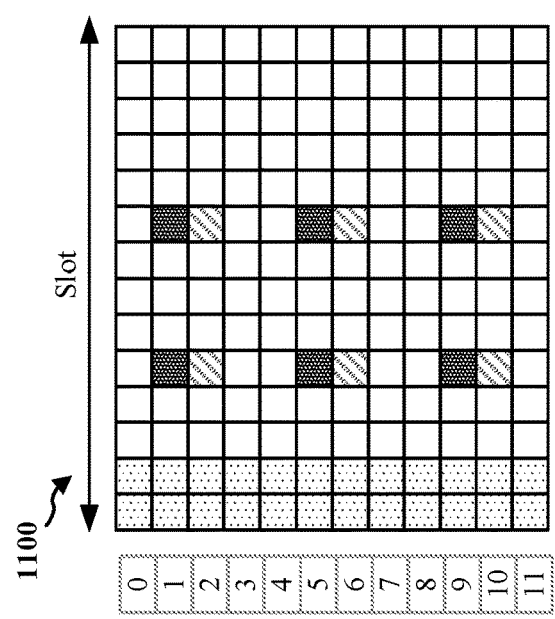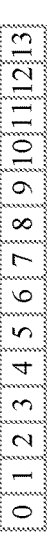
FIG. 11A  FIG. 11B  FIG. 11C

REFERENCE SIGNAL MULTIPLEXING WITH DOWNLINK DATA

CROSS REFERENCE TO RELATED APPLICATION(S)

This application claims the benefit of and priority to U.S. Provisional Patent Application Ser. No. 63/173,302, entitled "REFERENCE SIGNAL MULTIPLEXING WITH DOWNLINK DATA," and filed on Apr. 9, 2021, which is expressly incorporated by reference herein in its entirety.

TECHNICAL FIELD

The present disclosure relates generally to communication systems, and more particularly, to wireless communication including multiplexing of reference signals and data.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). An example apparatus receives, from a base station, a reference signal configuration associated with at least one of a tracking reference signal (TRS) and a channel state information reference signal (CSI-RS), the reference signal configuration comprising a symbol level rate matching configuration, a precoder configuration, or a guard tone configuration. The example apparatus also receives, from the base station, a transmission comprising at least a reference signal and data based on the reference signal configuration.

In another aspect of the disclosure, a method, a computer-readable medium, and an apparatus are provided for wireless communication of a base station. An example apparatus transmits, to a UE, a reference signal configuration associated with at least one of a TRS and a CSI-RS, the reference signal configuration comprising a symbol level rate matching configuration, a precoder configuration, or a guard tone configuration. The example apparatus also transmits a reference signal and data based on the reference signal configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11A is a diagram illustrating a first example slot of a frame including demodulation reference signals (DM-RS), in accordance with various aspects of the present disclosure.

FIG. 11B is a diagram illustrating a second example slot of a frame including DM-RS, in accordance with various aspects of the present disclosure.

FIG. 11C is a diagram illustrating a third example slot of a frame including DM-RS, in accordance with various aspects of the present disclosure.

DETAILED DESCRIPTION

Figure 1:
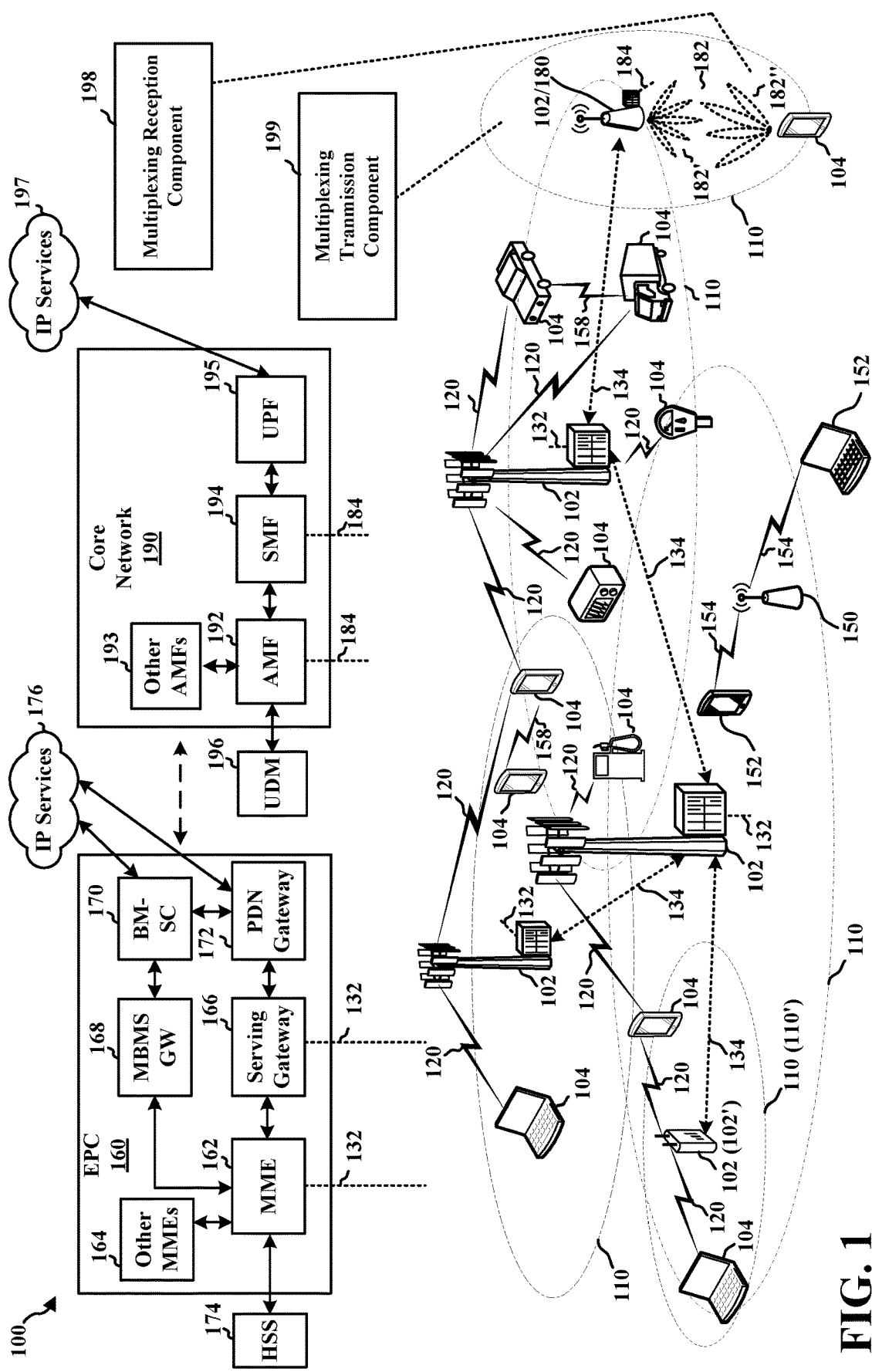
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

A UE may receive a reference signal and use the reference signal to estimate aspects associated with a channel. In some examples, a reference signal and data may be multiplexed (e.g., time division multiplexed (TDM)) in a same resource block. In some examples, when the reference signal and the data are transmitted together to the same UE, different precoders (e.g., beams) may be used. For example, a subband precoder may be used for the data and a wideband precoder may be used for the reference signal. The subband precoder used for the data may provide for improved decoding relative to the wideband precoder.

In some examples, the received reference signal and data may be associated with different signal strengths, for example, due to the different precoders. For example, a UE comprising two receiver antennas may experience a scenario in which the received reference signal may be stronger than the data. Additionally, in examples in which phase noise is generated over the channel (e.g., due to the transmitter and/or the receiver), the reference signal may interfere with the data and cause a decoding failure.

Aspects disclosed herein provide techniques for transmitting and receiving a transmission including reference signal multiplexing with data. For example, disclosed techniques enable the UE to receive the reference signal and to receive the data without the reference signal interfering with the data. In some aspects, the UE may receive a reference signal configuration that configures the UE to receive the reference signal and to receive the data of the transmission.

FIG. 1 is a diagram illustrating an example of a wireless communications system and an access network 100 including base stations 102, 180 and UEs 104. In certain aspects, a device in communication with a base station, such as a UE 104, may include a multiplexing reception component 198 configured to receive, from a base station (e.g., the base stations 102, 180), a reference signal configuration associated with at least one of a TRS and a CSI-RS. The example reference signal configuration may comprise a symbol level rate matching configuration, a precoder configuration, or a guard tone configuration. The example multiplexing reception component 198 may also be configured to receive, from the base station, a transmission comprising at least a reference signal and data based on the reference signal configuration.

In another configuration, a base station, such as the base stations 102, 180, may include a multiplexing transmission component 199 configured to transmit, to a UE (e.g., the UE 104), a reference signal configuration associated with at least one of a TRS and a CSI-RS. The example reference signal configuration may comprise a symbol level rate matching configuration, a precoder configuration, or a guard tone configuration. The example multiplexing transmission component 199 may also be configured to transmit a reference signal and data based on the reference signal configuration.

The aspects presented herein may enable a UE to receive and decode reference signals and data that may be multiplexed, which may facilitate improving communication performance, for example, by reducing interference between the multiplexed reference signal and data.

Although the following description provides examples directed to 5G NR (and, in particular, to transmissions including reference signals multiplexed with data), the concepts described herein may be applicable to other similar areas, such as LTE, LTE-A, CDMA, GSM, and/or other wireless technologies, in which a UE may receive a downlink transmission comprising reference signals multiplexed with data.

Additionally, while the following description provides examples directed to reference signals comprising TRS, the concepts described herein may be applicable to other reference signals that facilitate channel propagation estimation, such as CSI-RS.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
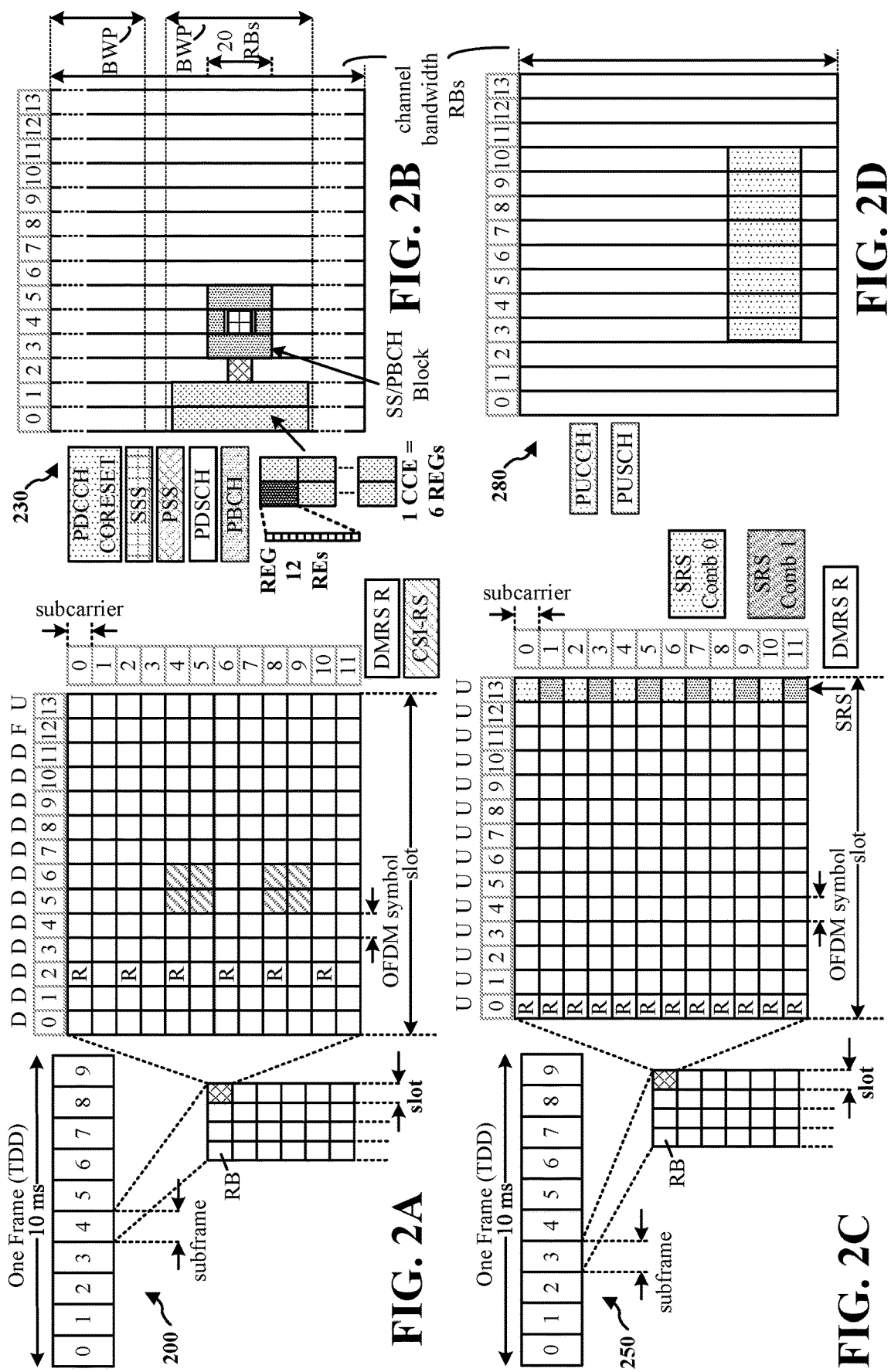
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
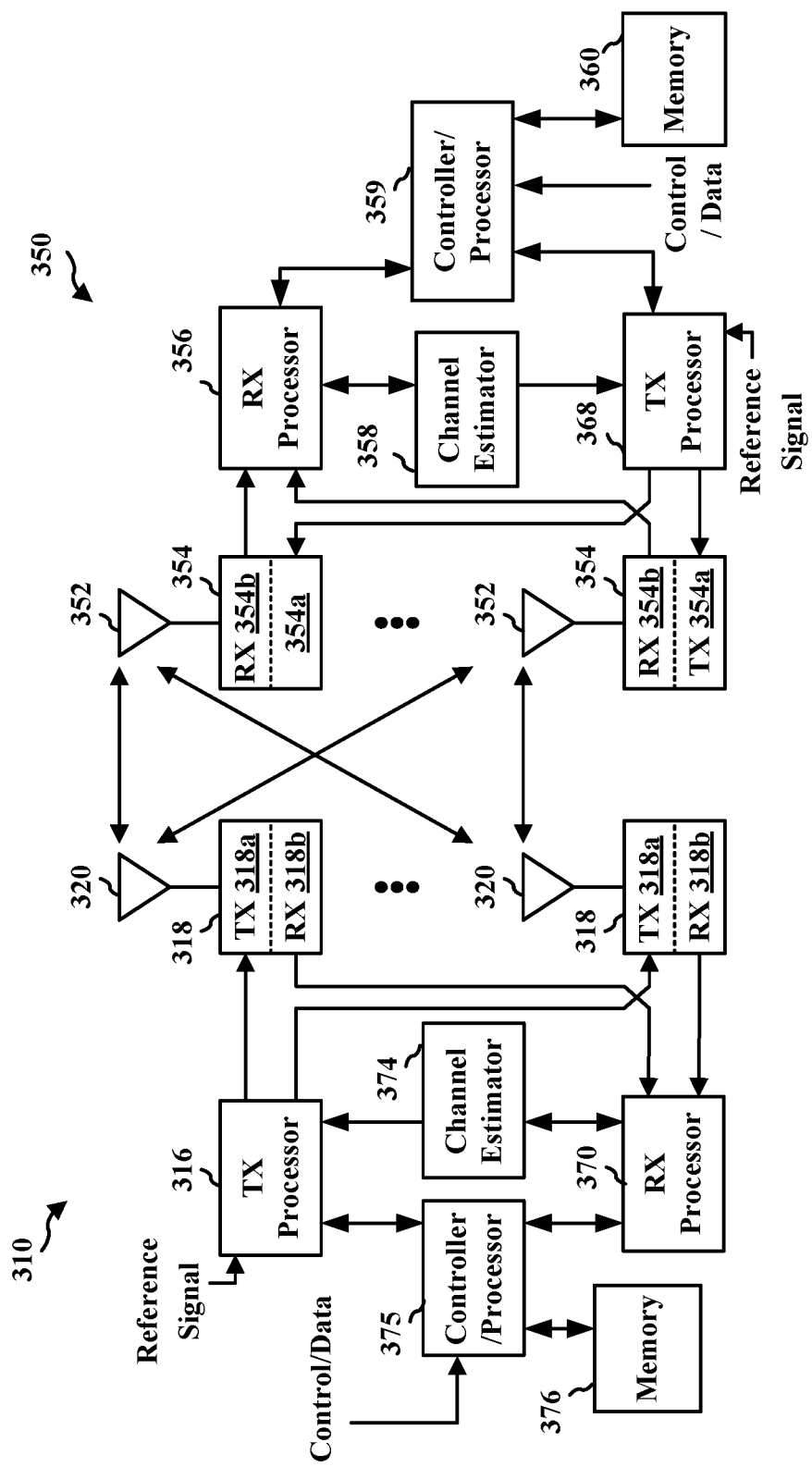
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multiplexing reception component 198 of FIG. 1.

At least one of the TX processor 316, the RX processor 370, and the controller/processor 375 may be configured to perform aspects in connection with the multiplexing transmission component 199 of FIG. 1.

A UE may receive a reference signal and use the reference signal to estimate aspects associated with a channel. For example, a UE may use a DM-RS to estimate the propagation channel experienced by PBCH, by PDCCH, and/or by PDSCH. A UE may use a CSI-RS to provide a CSI report to a base station based upon measurements from the CSI-RS. For example, the UE may derive channel quality indicators (CQI), rank indicators (RI), and precoding matrix indicators (PMI) from CSI-RS measurements. The UE may use a TRS to track time and frequency variations with a high resolution. For example, synchronization signals may allow for relatively course synchronization while the TRS may allow for fine tuning. Improved synchronization can benefit the performance of data transfer in both the uplink direction and the downlink direction. The UE may use a PT-RS to estimate and subsequently compensate for both phase noise and frequency offsets.

Figure 4:
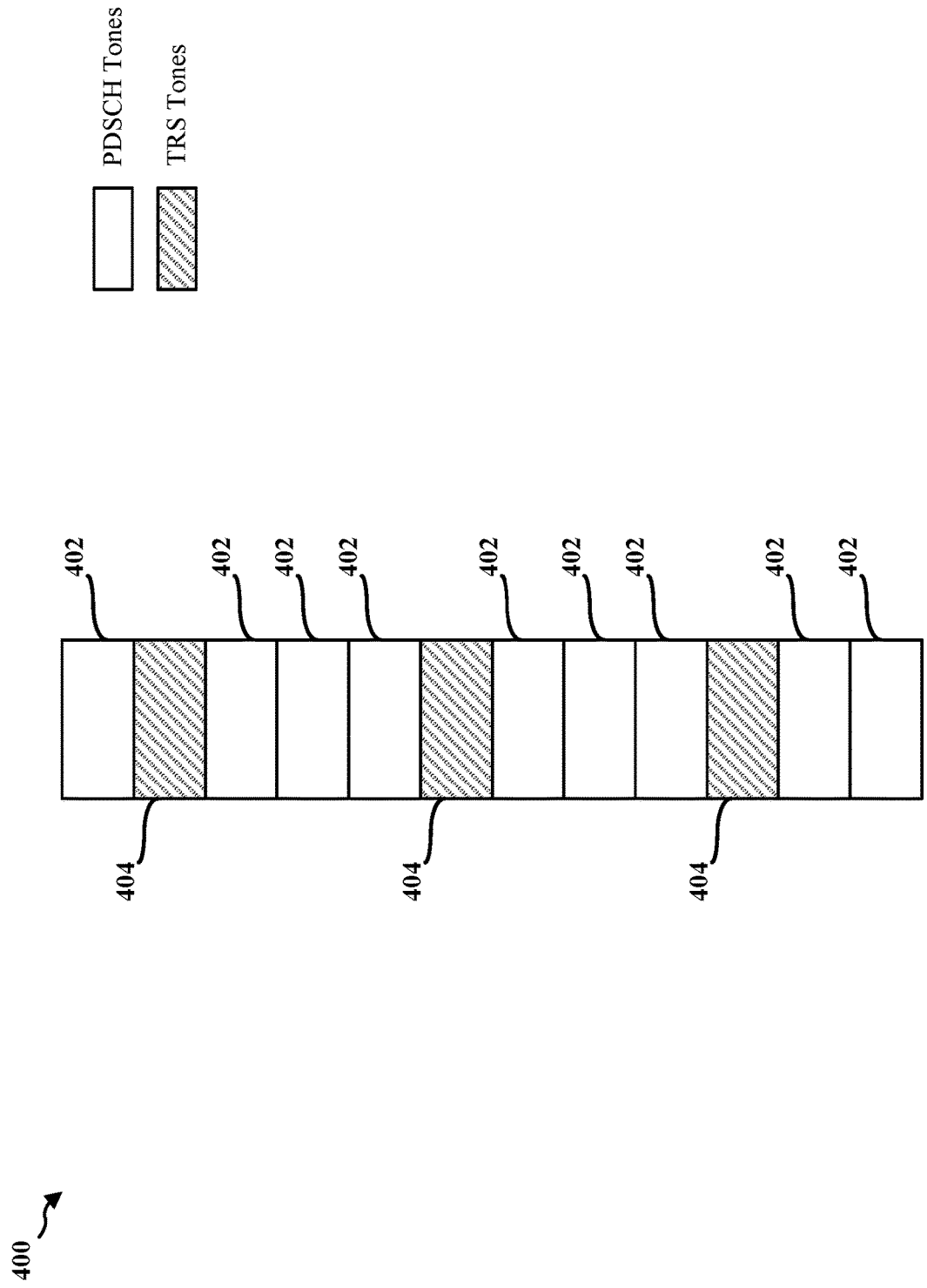
FIG. 4 is a diagram illustrating an example resource block, in accordance with various aspects of the present disclosure.

In some examples, a reference signal and data may be multiplexed (e.g., time division multiplexed (TDM)) in a same resource block. FIG. 4 illustrates an example resource block 400 including data tones and reference signal tones. In the example of FIG. 4, the data tones comprise PDSCH tones 402 and the reference signal tones comprise TRS tones 404. The TRS tones 404 may be used for time and frequency tracking.

In some examples, when the reference signal and the data are transmitted together to the same UE, different precoders (e.g., beams) may be used. For example, a subband precoder may be used for the data (e.g., the PDSCH tones 402) and a wideband precoder may be used for the reference signal (e.g., the TRS tones 404). The subband precoder used for the data may provide for improved decoding relative to the wideband precoder.

In some examples including a line-of-sight channel in which a beam may be narrow and strong (e.g., a clustered delay line (CDL) channel, such as a CDL-D channel), the received reference signal and data may be associated with different signal strengths, for example, due to the different precoders. For example, a UE comprising two receiver antennas may experience a scenario in which the TRS tones 404 may be stronger than the PDSCH tones 402 in at least one of the receiver antennas. Additionally, in examples in which phase noise is generated over the channel (e.g., due to the transmitter and/or the receiver), the TRS tones 404 may interfere with the PDSCH tones 402 and cause a decoding failure.

Figure 5:
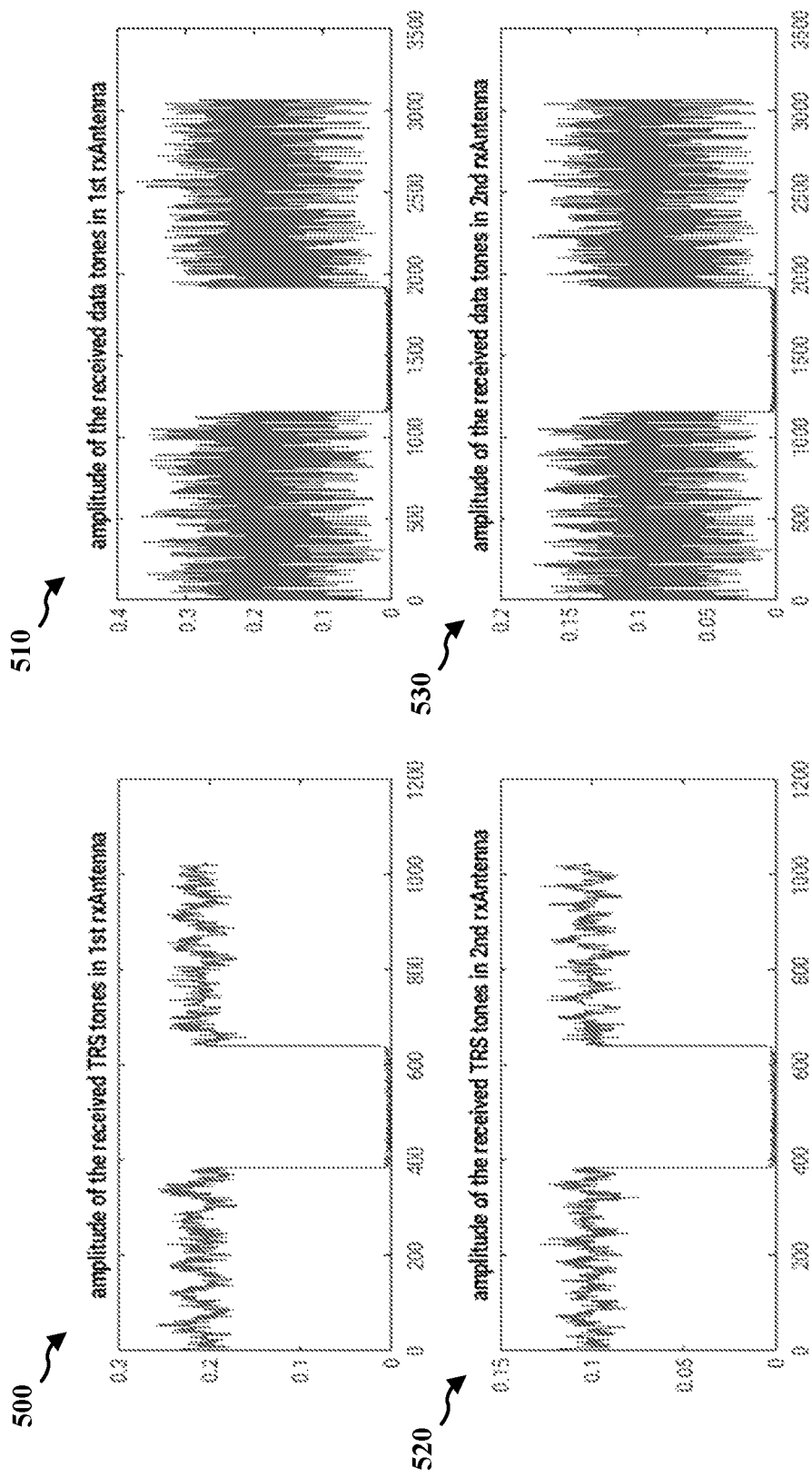
FIG. 5 is a diagram illustrating a first example of received TRS tone amplitudes and received data tone amplitudes, in accordance with various aspects of the present disclosure.

FIG. 5 is a diagram illustrating a first example of received TRS tone amplitudes and received data tone amplitudes, as presented herein. As shown in FIG. 5, the TRS tones and the data tones are received at a UE comprising two receiver antennas. In the example of FIG. 5, a first diagram 500 illustrates the amplitude of received TRS tones at a first receiver antenna ("1st rxAntenna") and a second diagram 510 illustrates the amplitude of received data tones at the first receiver antenna. The example of FIG. 5 also includes a third diagram 520 illustrating the amplitude of received TRS tones at a second receiver antenna ("2nd rxAntenna") and a fourth diagram 530 illustrating the amplitude of received data tones at the second receiver antenna.

As shown in FIG. 5, the amplitudes of the received TRS tones and the data tones at the first receiver antenna are approximately 0.2. Additionally, the amplitudes of the received TRS tones and the data tones at the second receiver antenna are approximately 0.1. As shown in FIG. 5, the first receiver antenna and the second receiver antenna experienced phase noise when receiving the TRS tones and the data tones.

In examples in which the amplitudes of the TRS tones are not significantly higher than the amplitude of the data tones, the UE may employ interference management techniques (e.g., inter-carrier interference (ICI) compensation techniques) to compensate for (e.g., reduce) interference. As a result, the UE may successfully decode the TRS and the data.

Figure 6:
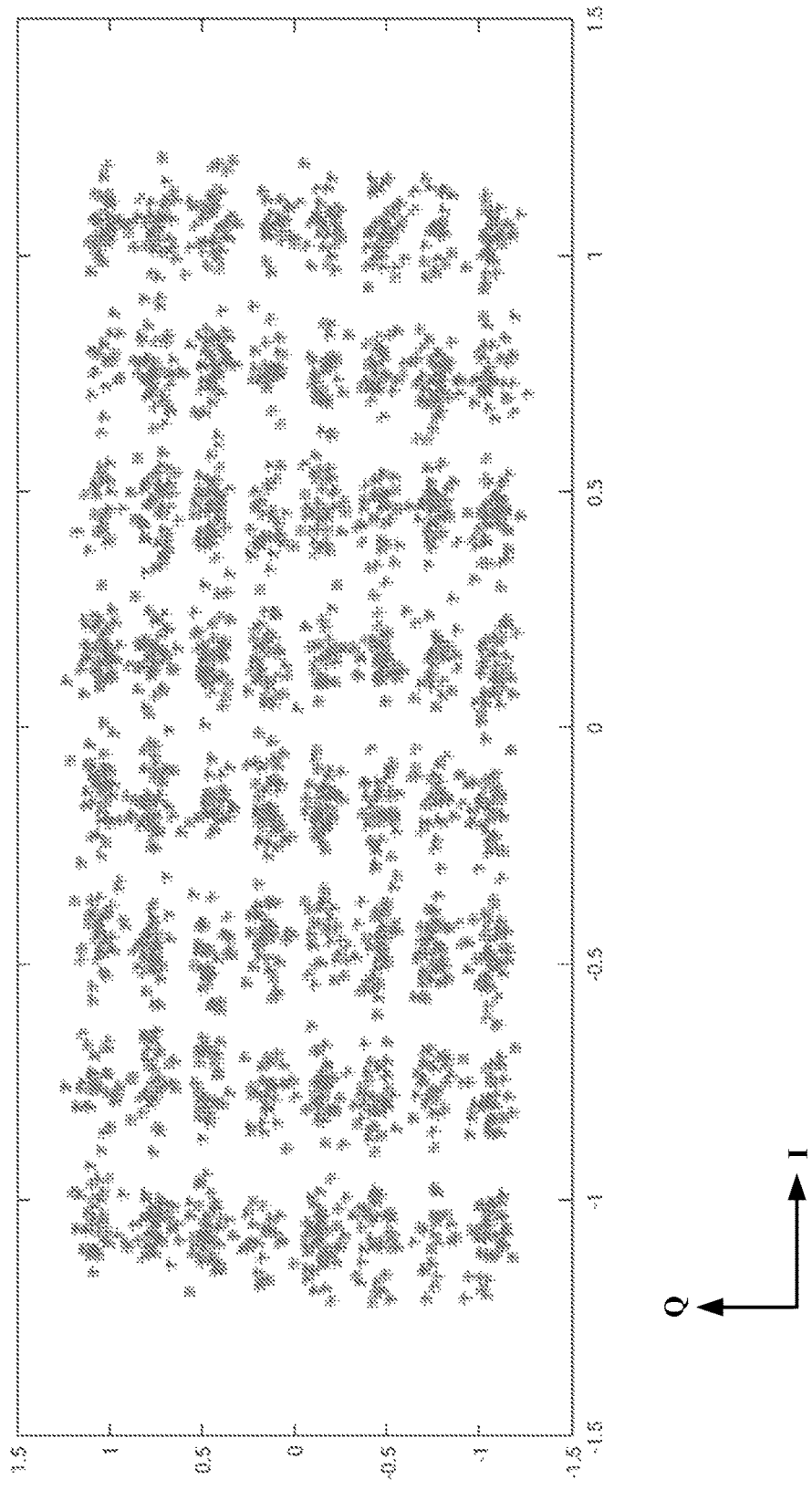
FIG. 6 is a diagram illustrating a first example signal constellation associated with the first example of received TRS tone amplitudes and received data tone amplitudes of FIG. 5, in accordance with various aspects of the present disclosure.

FIG. 6 is a diagram illustrating an example signal constellation 600 associated with the first example of received TRS tone amplitudes and received data tone amplitudes of FIG. 5, as presented herein. In the example of FIG. 6, the signal constellation 600 is associated with a 64-QAM modulation scheme. For example, the signal constellation 600 comprises eight symbols along the I-axis and eight symbols along the Q-axis. In the example of FIG. 6, the eight symbols range between approximately −1 and +1 along the I-axis and the Q-axis. As shown in FIG. 6, the symbols of the signal constellation 600 may be differentiated.

Figure 7:
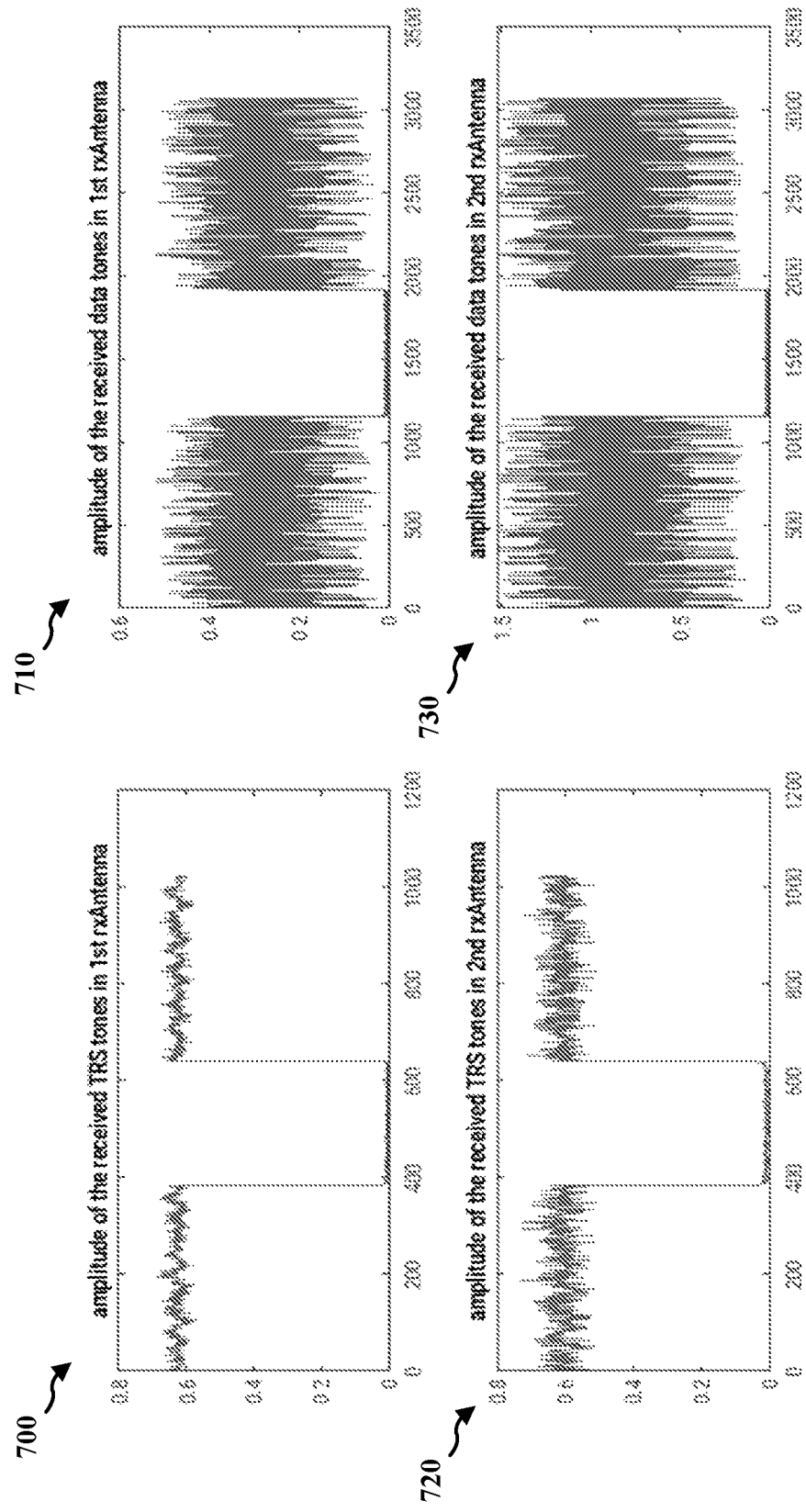
FIG. 7 is a diagram illustrating a second example of received TRS tone amplitudes and received data tone amplitudes, in accordance with various aspects of the present disclosure.

FIG. 7 is a diagram illustrating a second example of received TRS tone amplitudes and received data tone amplitudes, as presented herein. Similar to the example of FIG. 5, the TRS tones and the data tones are received at a UE comprising two receiver antennas. In the example of FIG. 7, a first diagram 700 illustrates the amplitude of received TRS tones at a first receiver antenna ("1st rxAntenna") and a second diagram 710 illustrates the amplitude of received data tones at the first receiver antenna. The example of FIG. 7 also includes a third diagram 720 illustrating the amplitude of received TRS tones at a second receiver antenna ("2nd rxAntenna") and a fourth diagram 730 illustrating the amplitude of received data tones at the second receiver antenna.

As shown in FIG. 7, the amplitudes of the received TRS tones at the first receiver antenna, as shown at the first diagram 700, are approximately 0.6 and the amplitudes of the received data tones at the first receiver antenna, as shown at the second diagram 710, are approximately 0.3. Additionally, the amplitudes of the received TRS tones at the second receiver antenna, as shown at the third diagram 720, are approximately 0.6 and the amplitudes of the received data tones at the first receiver antenna, as shown at the fourth diagram 730, are approximately 0.6. As shown in FIG. 7, the first receiver antenna and the second receiver antenna experienced phase noise when receiving the TRS tones and the data tones.

In examples in which the amplitudes of the TRS tones are significantly higher than that of the data tones at an antenna, the UE may be unable to compensate for the interference. For example, the amplitudes of the TRS tones (e.g., approximately 0.6) are significantly higher than that of the data tones (e.g., approximately 0.3) received at the first receiver antenna (e.g., as shown in the first diagram 700 and the second diagram 710, respectively). Hence, with high phase noise, ICI compensation may not be sufficient to suppress the TRS interference on the data tones. In contrast, the amplitudes of the TRS tones (e.g., approximately 0.6) is less than that of the data tones (e.g., approximately 1) received at the second receiver antenna (e.g., as shown in the third diagram 720 and the fourth diagram 730, respectively). However, the receiver may be unable to determine which antenna experiences more interference. As a result, when the TRS tones and the data tones are multiplexed in the same symbol, the UE may experience decoding failure.

Figure 8:
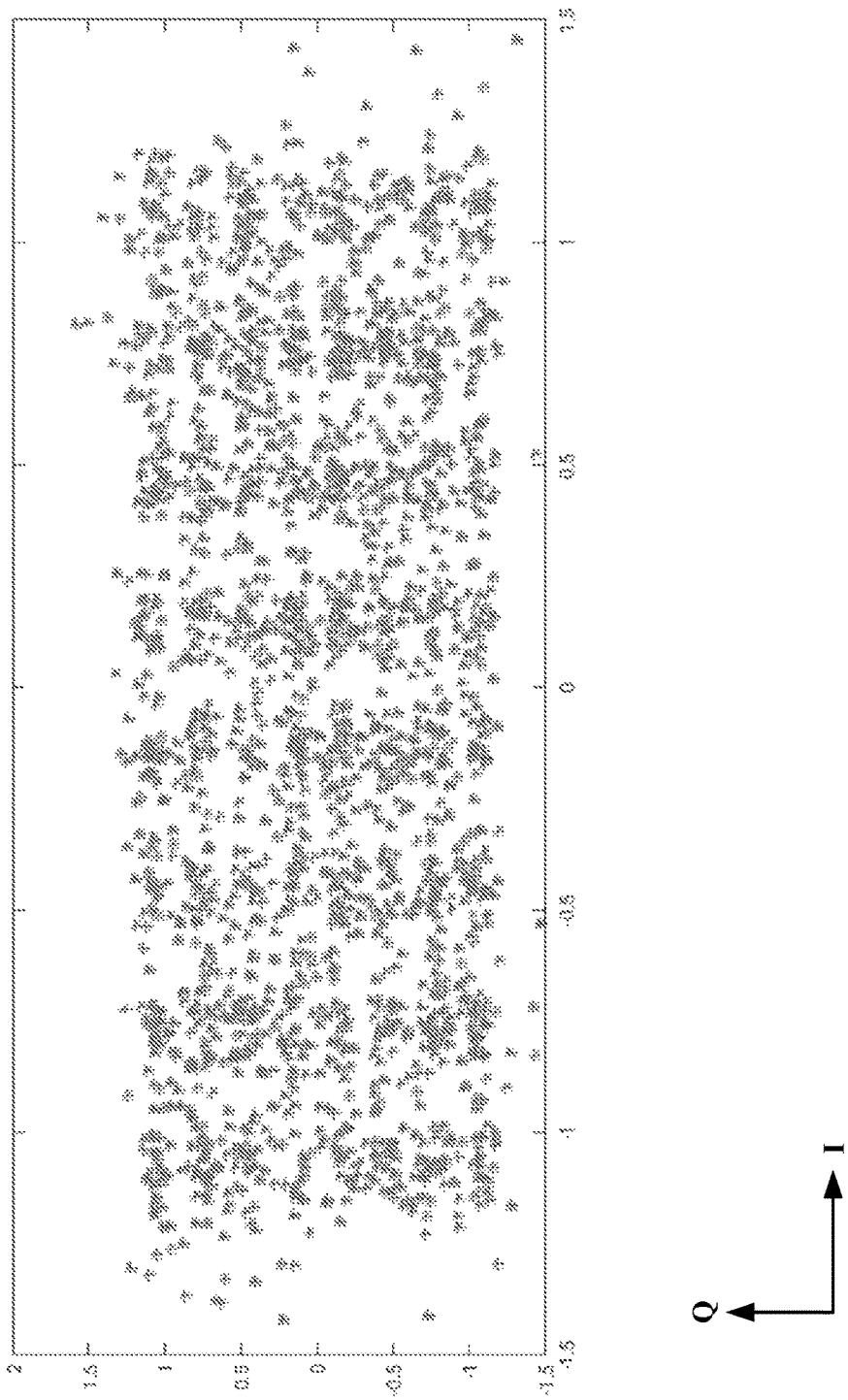
FIG. 8 is a diagram illustrating a second example signal constellation associated with the second example of received TRS tone amplitudes and received data tone amplitudes of FIG. 7, in accordance with various aspects of the present disclosure.

FIG. 8 is a diagram illustrating an example signal constellation 800 associated with the second example of received TRS tone amplitudes and received data tone amplitudes of FIG. 7, as presented herein. Similar to the example of FIG. 6, the signal constellation 800 is associated with a 64-QAM modulation scheme. For example, the signal constellation 800 comprises eight symbols ranging between approximately −1 and +1 along the I-axis and eight symbols ranging between approximately −1 and +1 along the Q-axis. As shown in FIG. 8, the symbols of the signal constellation 800 may be difficult to differentiate. For example, the beginning and the end of each symbol may overlap. In such examples, the UE may experience decoding failure when performing demodulation of the received TRS tones and the received data tones.

As described above, a transmission received by a UE may include data (e.g., the data PDSCH tones 402 of FIG. 4). In some examples, the transmission may also include a reference signal (e.g., the TRS tones 404 of FIG. 4). Additionally, or alternatively, the transmission may experience phase noise when transmitted from the base station to the UE. In examples in which the transmission includes data, does not include a reference signal, and does not experience phase noise, the UE may be able to decode the data with a low error rate. Similarly, in examples in which the transmission includes data, includes one of a reference signal or phase noise, and does not include the other one of the reference signal or the phase nose, the UE may be able to decode the data with a low error rate. For example, the transmission may include data and a reference signal (and not experience phase noise) or the transmission may include data and experience phase noise (and not include a reference signal). However, when the transmission includes data and a reference signal, and the transmission experiences phase noise, the error rate associated with decoding the data may increase, which may result in decoding failure of the data at the UE.

In some examples, a base station may provide a rate matching pattern that configures a UE to rate match around a TRS symbol. In some aspects, the term rate matching may be used herein to describe the rate matching of the data around the TRS symbol that is performed by the transmitter, e.g., base station. The corresponding process at the receiver in order to receive the data that has been rate matched around the TRS symbol may be referred to broadly herein as rate matching or may be referred to as de-rate matching. In such examples, the base station may transmit the rate matching pattern using a semi-static configuration (e.g., via RRC signaling) or DCI. For example, for periodic TRS, the base station may transmit the rate matching pattern to the UE using a semi-static configuration. In such examples, based on the rate matching pattern, the base station may refrain from transmitting data in symbols transmitting periodic TRS. In examples in which the TRS is aperiodic, the base station may transmit the rate matching pattern to the UE using DCI. In such examples, based on the rate matching pattern, the base station may refrain from transmitting data in symbols transmitting aperiodic TRS and may rate match the data within a set of resources that excludes the symbols of the TRS.

However, if such a rate matching pattern is associated with a transmission of a CORESET (e.g., a CORESET-0) or another designated purpose, using the rate matching pattern for TRS symbols may reduce the capacity of the configuration. For example, the rate matching pattern may comprise two bits and if the rate matching pattern is used to indicate rate matching around a TRS symbol, the rate matching pattern may be unable to be used for the designated purpose. Moreover, use of such a rate matching pattern may result in performing rate matching around a TRS tone within a symbol or a resource block, which may result in a scenario as described above in connection with FIG. 4 in which the TRS tones may interfere with the PDSCH tones.

Figure 9:
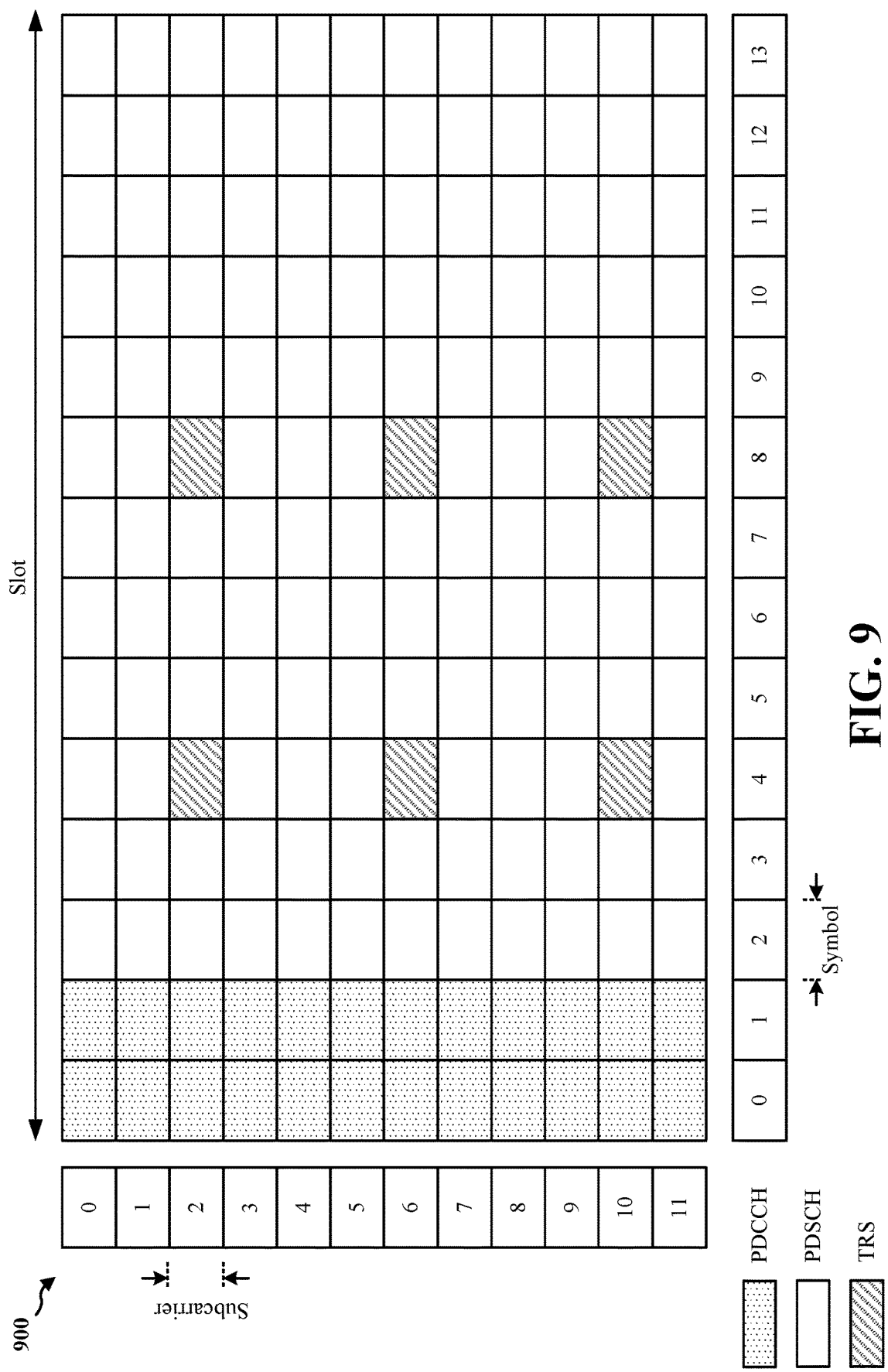
FIG. 9 is a diagram illustrating an example slot of a frame including control information, data, and reference signals, in accordance with various aspects of the present disclosure.

FIG. 9 is a diagram illustrating an example slot 900 of a frame including control information, data, and reference signals, as presented herein. In the illustrated example, the slot 900 comprises 12 consecutive subcarriers (e.g., in the frequency-domain) and fourteen consecutive symbols (e.g., in the time-domain). Aspects of the slot 900 may be implemented by the examples of FIGS. 2A, 2B, 2C, and/or 2D.

In the illustrated example of FIG. 9, the first two symbols (e.g., symbol 0 and symbol 1) of the slot 900 comprise control information (e.g., PDCCH). The example slot 900 also includes a TRS that may be indicated by a first TRS resource and a second TRS resource. In the example of FIG. 9, the first TRS resource may be allocated as tones within the fifth symbol (e.g., symbol 4) and the second TRS resource may be allocated as tones within the ninth symbol (e.g., symbol 8). In the example shown in FIG. 9, each TRS resource has a density of three tones per symbol and TRS resources within the same slot (e.g., the slot 900) are separated by four symbols. The spacing of the tones allocated to the TRS provides the UE with variations in both the time-domain and the frequency-domain.

In some examples, the base station may schedule data while avoiding TRS symbols. When the base station schedules the data, the base station may indicate a start symbol and a number of consecutive symbols. In such examples, when the base station schedules a TRS, the base station may also schedule data by indicating a start symbol and a number of consecutive symbols so that the symbols including data do not overlap with a symbol including the TRS.

In some examples in which the transmission of the TRS is infrequent (e.g., not frequent), the base station may schedule data by avoiding TRS slots (e.g., a slot including a TRS). For example, the base station may refrain from scheduling data within the example slot 900 of FIG. 9. However, such a scheduling scheme may result in an inefficient utilization of resources as the base station may avoid using a whole slot when scheduling data. Additionally, such a scheduling scheme may increase restrictions at the base station as the base station actively avoids the reference signal (e.g., the TRS) when scheduling the data.

In some examples, the base station may schedule data by scheduling data symbols before the first symbol including a TRS (e.g., before symbol 4 of the slot 900), after the last symbol including a TRS (e.g., after symbol 8 of the slot 900), or in-between the TRS symbols (e.g., between symbol 5 and symbol 7 of the slot 900). However, such a scheduling scheme may result in an inefficient utilization of resources. For example, when scheduling data after the last TRS symbol (e.g., the symbol 8 of the slot 900), the base station may indicate the start symbol of the data (e.g., symbol 9) and the number of consecutive symbols (e.g., 5 symbols). However, such a scheduling of the data results in the base station avoiding scheduling data within symbols 2, 3, 5, 6, and 7 of the slot 900. Additionally, such a scheduling scheme still imposes restrictions at the base station as the base station actively avoids symbols including the TRS when scheduling the data.

Aspects disclosed herein provide techniques for transmitting and receiving a transmission including reference signal multiplexing with data. For example, disclosed techniques enable the UE to receive the reference signal and to receive the data without the reference signal interfering with the data. In some aspects, the UE may receive a reference signal configuration that configures the UE to receive the reference signal and to receive the data of the transmission.

Figure 10:
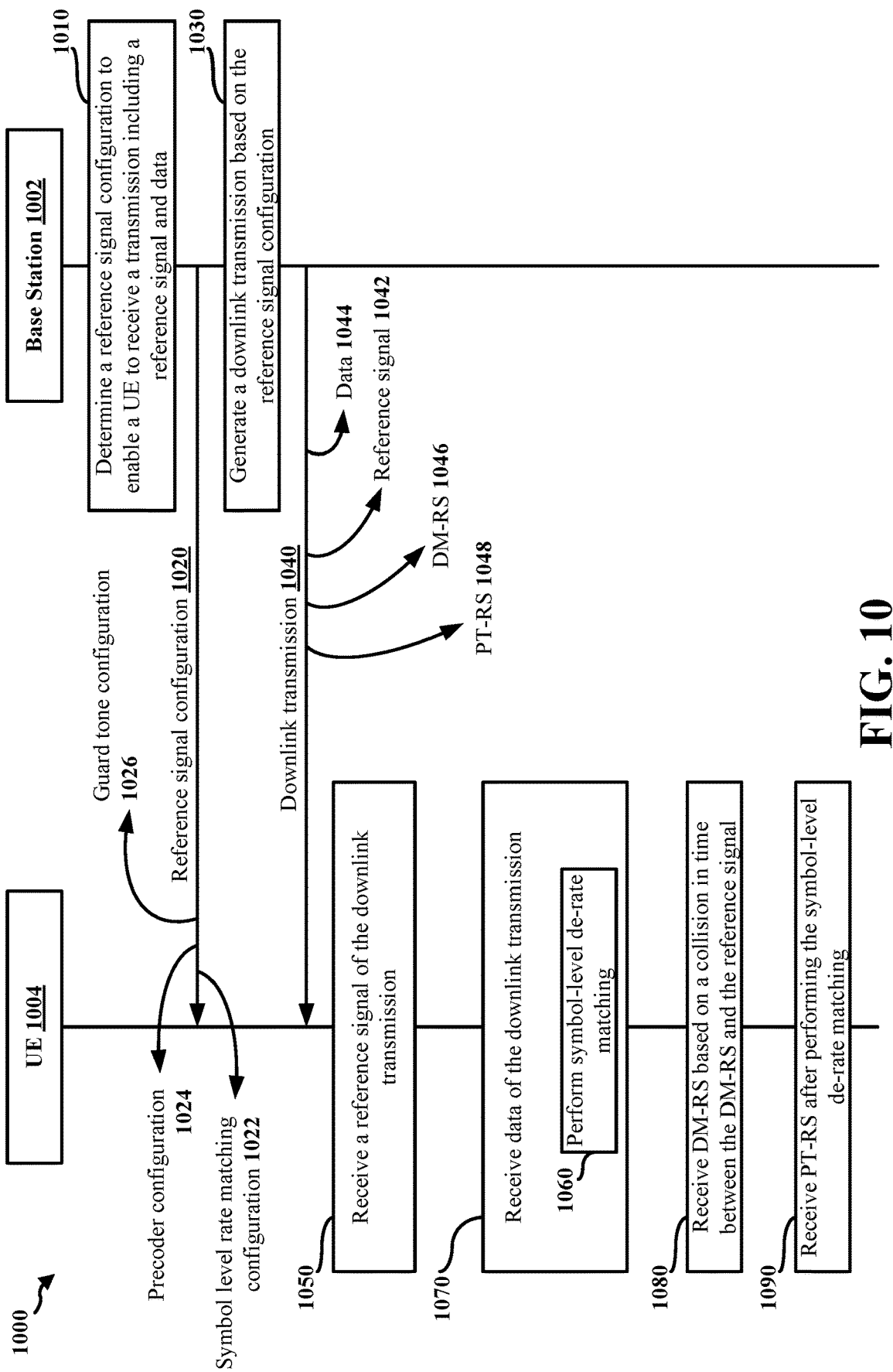
FIG. 10 is an example communication flow between a base station and a UE, in accordance with the teachings disclosed herein.

FIG. 10 illustrates an example communication flow 1000 between a base station 1002 and a UE 1004, as presented herein. In the illustrated example, the communication flow 1000 facilitates the UE 1004 receiving a transmission comprising data and a reference signal, such as a TRS or a CSI-RS. Aspects of the base station 1002 may be implemented by the base station 102/180 of FIG. 1 and/or the base station 310 of FIG. 3. Aspects of the UE 1004 may be implemented by the UE 104 of FIG. 1 and/or the UE 350 of FIG. 3. Although not shown in the illustrated example of FIG. 10, it may be appreciated that in additional or alternative examples, the base station 1002 may be in communication with one or more other base stations or UEs, and/or the UE 1004 may be in communication with one or more other base stations or UEs.

Although the following description provides examples directed to reference signals comprising TRS, the concepts described herein may be applicable to other reference signals that facilitate channel propagation estimation, such as CSI-RS.

At 1010, the base station 1002 determines a reference signal configuration 1020 to enable a UE to receive a transmission including a reference signal and data. The reference signal configuration 1020 may configure the UE 1004 to receive the reference signal and the data without the reference signal interfering with the data. In some examples, the reference signal configuration 1020 may configure the UE 1004 to perform symbol-level rate matching around one or more symbols including a reference signal. In some examples, the reference signal configuration 1020 may configure the UE 1004 so that the reference signal and the data are associated with a same precoder. In some examples, the reference signal configuration 1020 may configure the UE 1004 to process the presence of one or more guard tones between a data tone and a reference signal tone when receiving the reference signal and the data.

As shown in FIG. 10, the base station 1002 transmits the reference signal configuration 1020 that is received by the UE 1004. The base station 1002 may transmit the reference signal configuration 1020 using system information. In some examples, the base station 1002 may transmit the reference signal configuration 1020 via RRC signaling. In other examples, the base station 1002 may transmit the reference signal configuration 1020 using a medium access control (MAC)—control element (MAC-CE).

At 1030, the base station 1002 generates a downlink transmission 1040. The downlink transmission 1040 may include at least a reference signal 1042 and data 1044. For example, the downlink transmission 1040 may include at least one slot, such as the example slot 900 of FIG. 9, that includes reference signal tones (e.g., TRS tones) and data tones (e.g., PDSCH tones).

In the illustrated example, the base station 1002 generates the downlink transmission 1040 based on the reference signal configuration 1020. For example, the base station 1002 may generate the downlink transmission 1040 by performing a symbol-level rate matching of the data 1044 around one or more symbols including the reference signal 1042. In other examples, the base station 1002 may generate the downlink transmission 1040 by transmitting the reference signal 1042 and the data 1044 using a same precoder. In other examples, the base station 1002 may generate the downlink transmission 1040 so that the reference signal tones and the data tones within a resource block are separated by one or more guard tones.

In the example of FIG. 10, the base station 1002 transmits the downlink transmission 1040 that is received by the UE 1004.

At 1050, the UE 1004 receives the reference signal 1042 of the downlink transmission 1040.

At 1070, the UE 1004 receives the data 1044 of the downlink transmission 1040.

In the illustrated example of FIG. 10, the UE 1004 may receive the reference signal 1042 (e.g., at 1050) and may receive the data 1044 (e.g., at 1070) based on the reference signal configuration 1020. For example, the UE 1004 may perform symbol-level rate de-matching around the one or more symbols including the reference symbol to receive the data. In other examples, the UE 1004 may receive the reference signal 1042 and the data 1044 based on a same precoder. In other examples, the UE 1004 may receive the reference signal 1042 and the data 1044 separated by one or more guard tones.

As described above, in some examples, the reference signal configuration 1020 may configure the UE 1004 to perform symbol-level rate matching around one or more symbols including a reference signal. For example, the reference signal configuration 1020 may comprise a symbol-level rate matching configuration 1022. The symbol-level rate matching configuration 1022 may be used with periodic TRS and aperiodic TRS. The symbol-level rate matching configuration 1022 may include a TRS tone-level and/or a TRS symbol-level configuration. For example, and referring to the example of FIG. 9, the TRS tone-level configuration may indicate that TRS tones are located at subcarriers 2, 6, and 10 of the symbols 4 and 8 of the slot 900. Additionally, or alternatively, the TRS symbol-level configuration may indicate that the symbols 4 and 8 of the slot 900 are TRS symbols.

In some examples, the symbol-level rate matching configuration 1022 may also include a TRS configuration. The TRS configuration may indicate a TRS subcarrier spacing ($\Delta k_{TRS}$) and a TRS symbol spacing within a slot ($\Delta n_{TRS}$). For example, and with respect to the example of FIG. 9, the TRS configuration may indicate a TRS subcarrier spacing of four tones (e.g., $\Delta k_{TRS}=4$) such that TRS tones within a symbol are separated by four subcarriers (e.g., TRS tones located at subcarriers 2, 6, and 10). The TRS configuration may also indicate a TRS symbol spacing within a slot of five symbols ($\Delta n_{TRS}=5$) such that symbols containing a TRS tone are separated by five symbols (e.g., TRS symbols located at symbols 4 and 8).

In some such examples in which the base station 1002 transmits the symbol-level rate matching configuration 1022, when the base station 1002 generates the downlink transmission based on the symbol-level rate matching configuration 1022 (e.g., at 1030 the base station may perform a symbol-level rate matching of the data in resources for a PDSCH that exclude the symbols including the TRS), the base station 1002 transmits the reference signal 1042 based on the TRS tone-level configuration and/or the TRS symbol-level configuration. The base station 1002 also performs symbol-level rate matching around the one or more symbols including the reference signal 1042. For example, when scheduling the data 1044, the base station 1002 may indicate a starting symbol and a number of symbols. The base station 1002 may transmit the data 1044 based on the data schedule and based on performing the symbol-level rate matching around the one or more symbols including the reference signal 1042. For example, and referring to the example of FIG. 9, the base station 1002 may schedule the data 1044 by indicating symbol 2 as the starting symbol and indicating six symbols. The base station 1002 may then perform symbol-level rate matching by transmitting the data 1044 at symbols 2, 3, 5, 6, 7, and 9. That is, the base station 1002 may transmit the data 1044 at the indicated starting symbol (e.g., symbol 2) and for the indicated number of symbols (e.g., six symbols) while skipping the one or more symbols including the reference signal 1042 (e.g., the symbols 4 and 8).

After receiving the downlink transmission 1040, the UE 1004 may receive the reference signal 1042 of the downlink transmission 1040 (e.g., at 1050) based on the symbol-level rate matching configuration 1022. For example, the UE 1004 may receive the reference signal 1042 at the tones indicated by the TRS tone-level configuration and/or at the symbols indicated by the TRS symbol-level configuration.

The UE 1004 may receive the data 1044 of the downlink transmission 1040 (e.g., at 1070) based on the symbol-level rate matching configuration 1022. For example, the UE 1004 may receive the data 1044 based on the data schedule and based on performing, at 1060, symbol-level de-rate matching around the one or more symbols including the reference signal 1042. For example, and continuing the above example, the UE 1004 may receive the data schedule indicating symbol 2 as the starting symbol and indicating six symbols. In such examples, the UE 1004 may receive the data 1044 at the indicated starting symbol (e.g., symbol 2) and for the indicated number of symbols (e.g., six symbols) while skipping the one or more symbols including the reference signal 1042 (e.g., the symbols 4 and 8). That is, the UE 1004 may receive the data 1044 at the symbols 2, 3, 5, 6, 7, and 9 of the slot 900 of FIG. 9.

In some examples, the base station 1002 may transmit the downlink transmission 1040 including the reference signal 1042, the data 1044, and a DM-RS 1046. FIG. 11A is a diagram illustrating a first example slot 1100 of a frame including DM-RS, as presented herein. Aspects of the first example slot 1100 may be implemented by the example slot 900 of FIG. 9. In the illustrated example of FIG. 11A, the DM-RS symbols (e.g., the one or more symbols including DM-RS) collide in time with the TRS symbols (e.g., the one or more symbols including TRS). For example, the symbols 4 and 8 include DM-RS tones at subcarriers 1, 5, and 9 and include TRS tones at subcarriers 2, 6, and 10. In some such examples, the DM-RS may have a first comb structure and the TRS may have a second comb structure that is different than the first comb structure. As a result, the DM-RS symbols may collide with the TRS symbols in the time-domain.

However, the DM-RS may be associated with a subband precoder, such as the subband precoder associated with the data. In some such examples, and similar to the example of FIG. 4, the TRS tones may interfere with the DM-RS tones and cause a decoding failure.

Returning to the example of FIG. 10, to reduce the occurrence of the DM-RS 1046 colliding with the reference signal 1042 in the time-domain, aspects disclosed herein facilitate adjusting the one or more symbols associated with the DM-RS 1046 or adjusting the one or more symbols associated with the reference signal 1042. For example, when the base station 1002 generates the downlink transmission 1040 (e.g., at 1030), the base station 1002 may determine that the DM-RS 1046 collides in time with the reference signal 1042, as shown in FIG. 11A. In some such examples, based on the collision in time between the DM-RS 1046 and the reference signal 1042, the base station 1002 may transmit the DM-RS 1046 at an adjusted symbol. The UE 1004 may receive, at 1080, the DM-RS 1046 based on a collision in time between the DM-RS 1046 and the reference signal 1042.

In some examples, the base station 1002 may transmit the DM-RS 1046 at a symbol that occurs after a colliding symbol. The UE 1004 may receive, at 1080, the DM-RS at an adjusted symbol that occurs after a colliding symbol. FIG. 11B is a diagram illustrating a second example slot 1120 of a frame including DM-RS, as presented herein. Aspects of the second example slot 1120 may be implemented by the example slot 900 of FIG. 9. In the illustrated example of FIG. 11B, the DM-RS tones are moved to the next symbol after the colliding symbol. For example, as shown in FIG. 11A, symbols 4 and 8 are the colliding symbols in which the DM-RS tones overlap in time with the TRS tones. In the example of FIG. 11B, the DM-RS tones are moved to the symbols 5 and 9 while the TRS tones remain in the symbols 4 and 8.

In some examples, the base station 1002 may transmit the reference signal 1042 at a symbol that occurs after a colliding symbol. The UE 1004 may receive, at 1080, the DM-RS at the colliding symbol. FIG. 11C is a diagram illustrating a third example slot 1140 of a frame including DM-RS, as presented herein. Aspects of the second example slot 1120 may be implemented by the example slot 900 of FIG. 9. In the illustrated example of FIG. 11C, the TRS tones are moved to the next symbol after the colliding symbol. For example, as shown in FIG. 11A, symbols 4 and 8 are the colliding symbols in which the DM-RS tones overlap in time with the TRS tones. In the example of FIG. 11C, the TRS tones are moved to the symbols 5 and 9 while the DM-RS tones remain in the symbols 4 and 8.

Returning to FIG. 10, in some examples, the base station 1002 may transmit the downlink transmission 1040 including the reference signal 1042, the data 1044, and a PT-RS 1048. The PT-RS 1048 may be configured in the time-domain by a time-domain start symbol and a density. The time-domain start symbol indicates a starting symbol and the density represents the time-domain spacing between symbols allocated to the PT-RS 1048. A density of four means that every fourth symbol can include the PT-RS 1048, a density of two means that every second symbol can include the PT-RS 1048, etc.

Figures 12A, 12B:
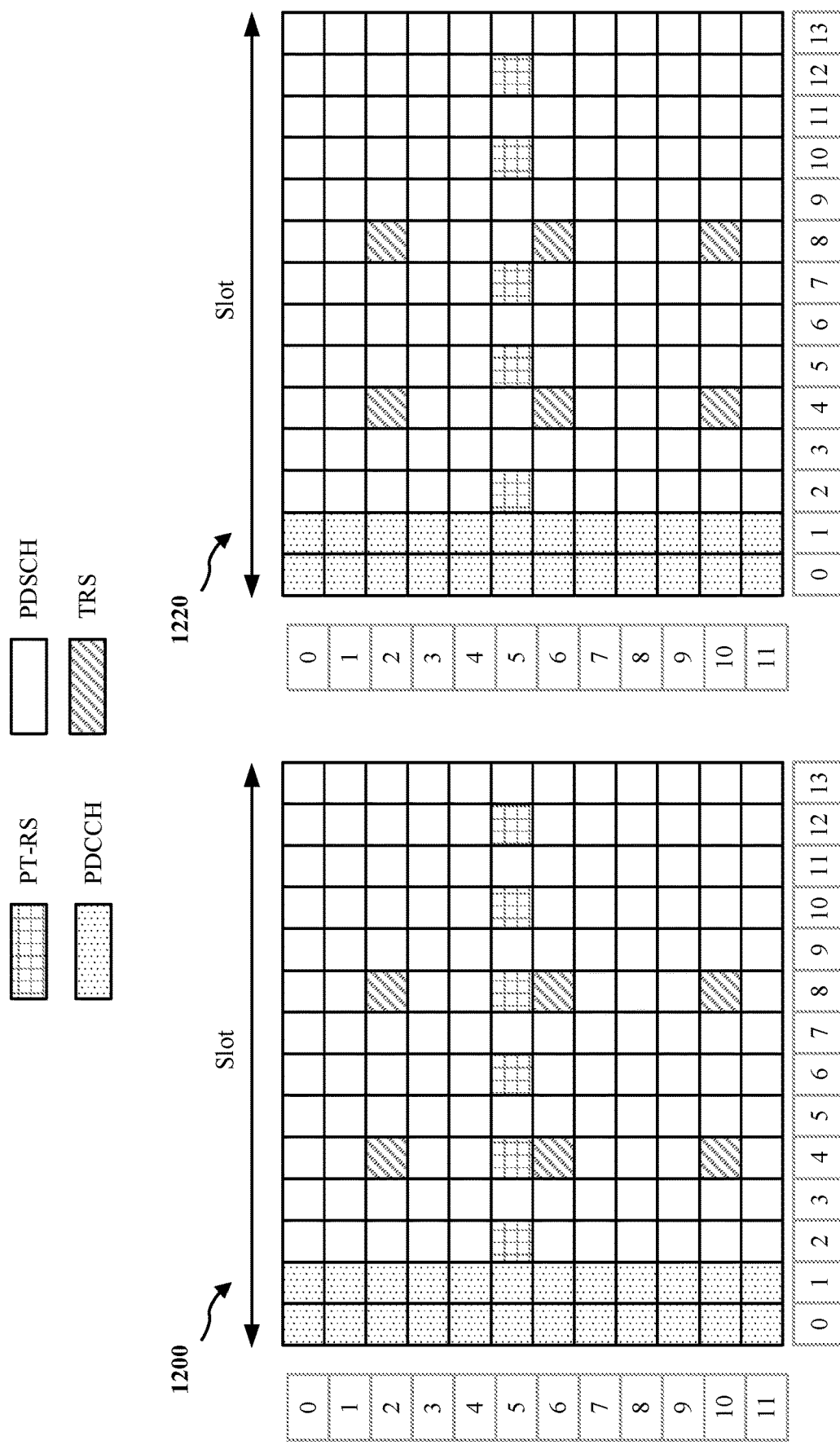
FIG. 12A is a diagram illustrating a first example slot of a frame including phase tracking reference signals (PT-RS), in accordance with various aspects of the present disclosure.
FIG. 12B is a diagram illustrating a second example slot of a frame including PT-RS, in accordance with various aspects of the present disclosure.

FIG. 12A is a diagram illustrating a first example slot 1200 of a frame including PT-RS, as presented herein. Aspects of the first example slot 1200 may be implemented by the example slot 900 of FIG. 9. In the illustrated example of FIG. 12A, the PT-RS is configured by a time-domain start symbol of symbol 2 and a density of value two. As shown in FIG. 12A, the symbols 4 and 8 are colliding symbols in which TRS symbols (e.g., the one or more symbols including TRS) collide in time with PT-RS symbols (e.g., the one or more symbols include PT-RS). Similar to the DM-RS and the data, the PT-RS may be associated with a subband precoder. In some such examples, and similar to the example of FIG. 4, the TRS tones may interfere with the PT-RS tones at the colliding symbols and cause a decoding failure.

Returning to the example of FIG. 10, to reduce the occurrence of the PT-RS 1048 colliding with the reference signal 1042 in the time-domain, aspects disclosed herein facilitate adjusting the density of the PT-RS 1048 relative to the data 1044 after performing rate-matching. For example, when the base station 1002 generates the downlink transmission 1040 (e.g., at 1030), the base station 1002 may determine that the PT-RS 1048 collides in time with the reference signal 1042, as shown in FIG. 12A. In some such examples, based on the collision in time between the PT-RS 1048 and the reference signal 1042, the base station 1002 may configure the PT-RS 1048 in the time-domain based on the time-domain start symbol and the density relative to the data 1044 after rate matching. The UE 1004 may receive, at 1090, the PT-RS 1048 based on the time-domain start symbol and the density relative to the data 1044 after performing the symbol-level de-rate matching (e.g., at 1060). For example, the UE 1004 may disregard the TRS symbols and count the data symbols when applying the density of the PT-RS to determine the symbol locations of the PT-RS.

FIG. 12B is a diagram illustrating a second example slot 1220 of a frame including PT-RS, as presented herein. Aspects of the second example slot 1220 may be implemented by the example slot 900 of FIG. 9. In the illustrated example of FIG. 12B, the PT-RS is configured by a time-domain start symbol of symbol 2 and a density of value two. However, to reduce the occurrences of the PT-RS and the TRS colliding in time, the symbol locations of the PT-RS, based on the density, are determined by counting the data symbols (e.g., disregarding the TRS symbols) after performing the symbol-level rate matching. For example, after performing the symbol-level rate matching, the base station 1002 may determine that the data symbols of the second example slot 1220 include the symbols 2, 3, 5 to 7, and 9 to 13. In a similar manner, after performing the symbol-level de-rate matching, the UE 1004 may determine that the data symbols of the second example slot 1220 include the symbols 2, 3, 5 to 7, and 9 to 13. The base station 1002 and the UE 1004 may determine the symbol locations of the PT-RS by counting the data symbols starting at the time-domain start symbol of symbol 2. As shown in FIG. 12B, the PT-RS symbols include the symbols 2, 5, 7, 10, and 12, which avoid colliding with the TRS symbols (e.g., the symbols 4 and 8).

Returning to the example of FIG. 10, in some examples, the reference signal configuration 1020 may configure the UE 1004 so that the reference signal and the data are associated with a same precoder. For example, the reference signal configuration 1020 may comprise a precoder configuration 1024. The precoder configuration 1024 may indicate that the reference signal 1042 and the data 1044 are associated with a same precoder.

TRS may use a single antenna port and, thus, a rank-1 transmission may be enforced. Thus, to use a same precoder for the reference signal 1042 and the data 1044, in some examples, the precoder configuration 1024 may indicate that the reference signal 1042 and the data 1044 are both associated with a wideband precoder. As a result, both the reference signal 1042 and the data 1044 may be decoded using a same wideband precoder and, thus, the amplitudes of the reference signal tones and the data tones received at an antenna may be approximately the same. Additionally, with the amplitudes being approximately the same, the UE may employ interference management techniques (e.g., ICI compensation techniques) to compensate for (e.g., reduce) interference. As a result, the UE may successfully decode the reference signal and the data. The use of a wideband precoder may help to avoid a reduction in resolution for the reference signal 1042.

In some examples, the precoder configuration 1024 may indicate that the reference signal 1042 and the data 1044 are both associated with a narrowband precoder. In such examples, the precoder configuration 1024 may indicate that the precoder is the same for a bundled resource block (RB) (e.g., a quantity of RBs). In some examples, the quantity of RBs included in a bundled RB may be selected so that the sample duration satisfies a timing threshold (e.g., the sample duration is less than or equal to the timing threshold). For example, for a bundled RB, Equation 1 (below) may be used to estimate a sample duration (sometimes referred to as a "minimum estimated timing offset").

$$\text{sampling duration} = \frac{1}{N * SCS} \qquad \text{Equation 1}$$

In Equation 1, the term "N" represents the number of tones and the term "SCS" represents the subcarrier spacing for the bundled RB. In some examples, an RB contains 12 tones. In such examples, the number of tones N may be calculated as 12 times the quantity of RBs of the bundled RB. For example, for a bundled RB comprising a quantity of four RBs (N=12*4=48 tones) and a subcarrier spacing of 120 KHz (SCS=120 KHz), the sample duration may be estimated at 0.1736 µs (e.g., 1/(48*120 KHz)=0.1736 µs). However, the cyclic prefix (CP) length may be 0.5859 µs. That is, the CP length is less than four times the estimated sample duration in the above example (e.g., 0.5859 µs/0.1736 µs=3.375). In such examples, the ability to perform timing corrections may be limited.

However, with a larger bundled RB, the sample duration may be reduced. For example, for a bundled RB comprising a quantity of 32 RBs (N=12*32=384 tones) and the same subcarrier spacing of 120 KHz (SCS=120 KHz), the sample duration may be estimated at 0.0217 µs (e.g., 1/(384*120 KHz)=0.0217 µs). In such examples, the CP length (0.5859 µs) is 27 times the estimated sample duration (e.g., 0.5859 µs/0.0217 µs=27). That is, with the larger bundled RB, finer timing correction may be performed.

Returning to the example of FIG. 10, in some examples, the reference signal configuration 1020 may configure the UE 1004 to process the presence of one or more guard tones between a data tone and a reference signal tone when receiving the reference signal and the data. For example, the reference signal configuration 1020 may comprise a guard tone configuration 1026. The guard tone configuration 1026 may indicate that guard tones are added around reference signal tones. The guard tones may mitigate interference between the reference signal tones and the data tones.

Figure 13:
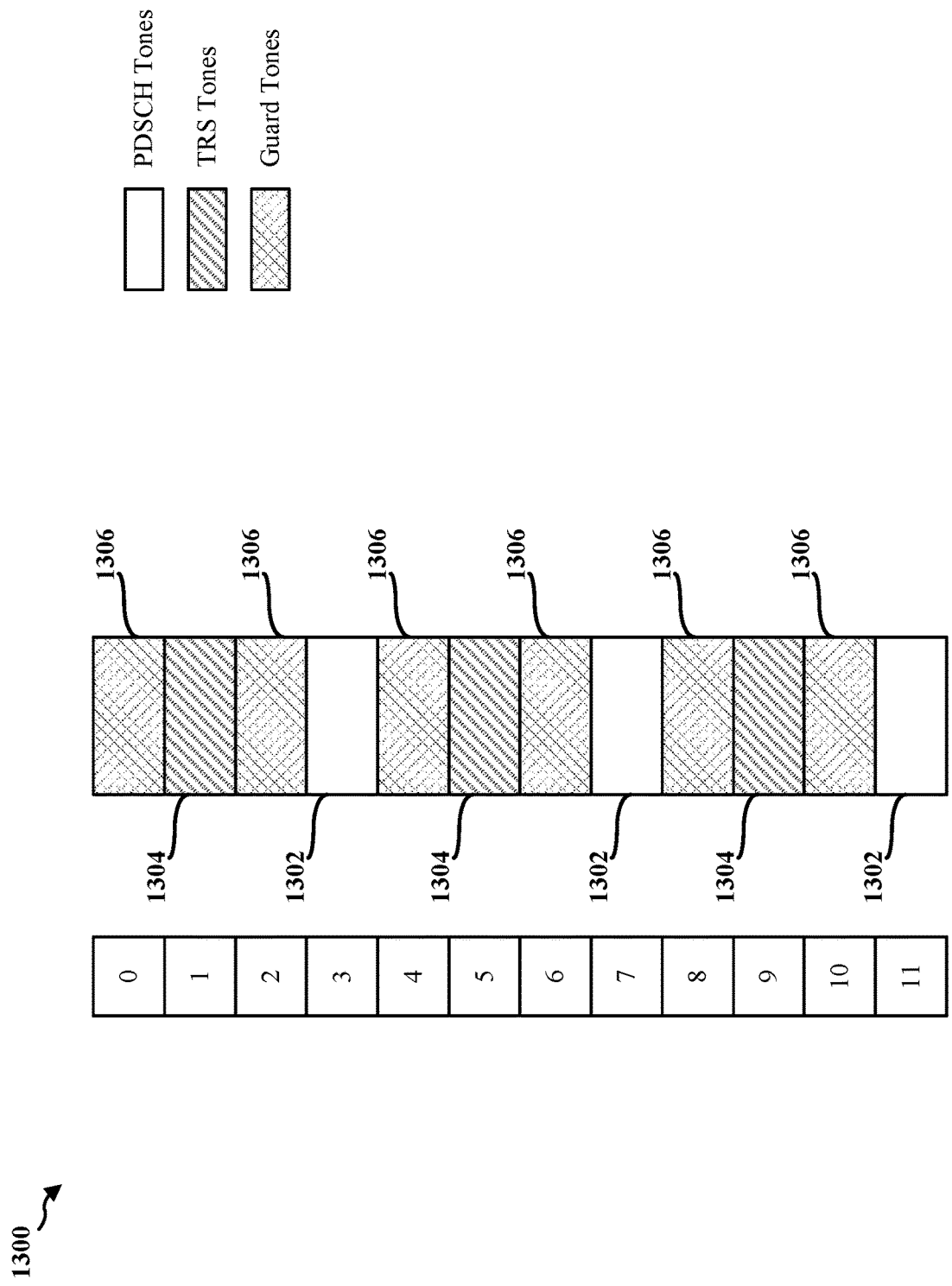
FIG. 13 is a diagram illustrating an example resource block including guard tones, in accordance with various aspects of the present disclosure.

FIG. 13 illustrates an example resource block 1300 including data tones, reference signal tones, and guard tones. In the example of FIG. 13, the data tones comprise PDSCH tones 1302 and the reference signal tones comprise TRS tones 1304. Aspects of the PDSCH tones 1302 may be implemented by the PDSCH tones 402 of FIG. 4. Aspects of the TRS tones 1304 may be implemented by the TRS tones 404 of FIG. 4.

The reference signal and the data in the resource block may be separated by one or more guard tones. In the illustrated example of FIG. 13, the guard tones 1306 may be positioned adjacent to the TRS tones 1304. For example, guard tones 1306 may be added at the subcarriers adjacent to the TRS tones 1304. By adding the guard tones 1306 around the TRS tones 1304, the tones of a resource block (or symbol) that may be used for data are separated from the tones that may be used for the TRS. As a result, interference between the TRS and the data may be mitigated.

In the example of FIG. 13, the resource block 1300 includes 12 tones including three TRS tones located at subcarriers 1, 5, and 9. It may be appreciated that by adding the guard tones 1306 around the TRS tones 1304 (e.g., at the subcarriers 0, 2, 4, 6, 8, and 10), the tones available for transmitting data (e.g., at the subcarriers 3, 7, and 11) are reduced compared to when no guard tones are added to the resource block. However, including the guard tones 1306 in the resource block 1300 separates the PDSCH tones 1302 from the TRS tones 1304, which mitigates interference between the reference signal (e.g., the TRS) and the data.

Although the examples of FIGS. 4 to 13 provide examples directed to reference signals comprising TRS, the concepts described herein may be applicable to other reference signals that facilitate channel propagation estimation, such as CSI-RS.

Figure 14:
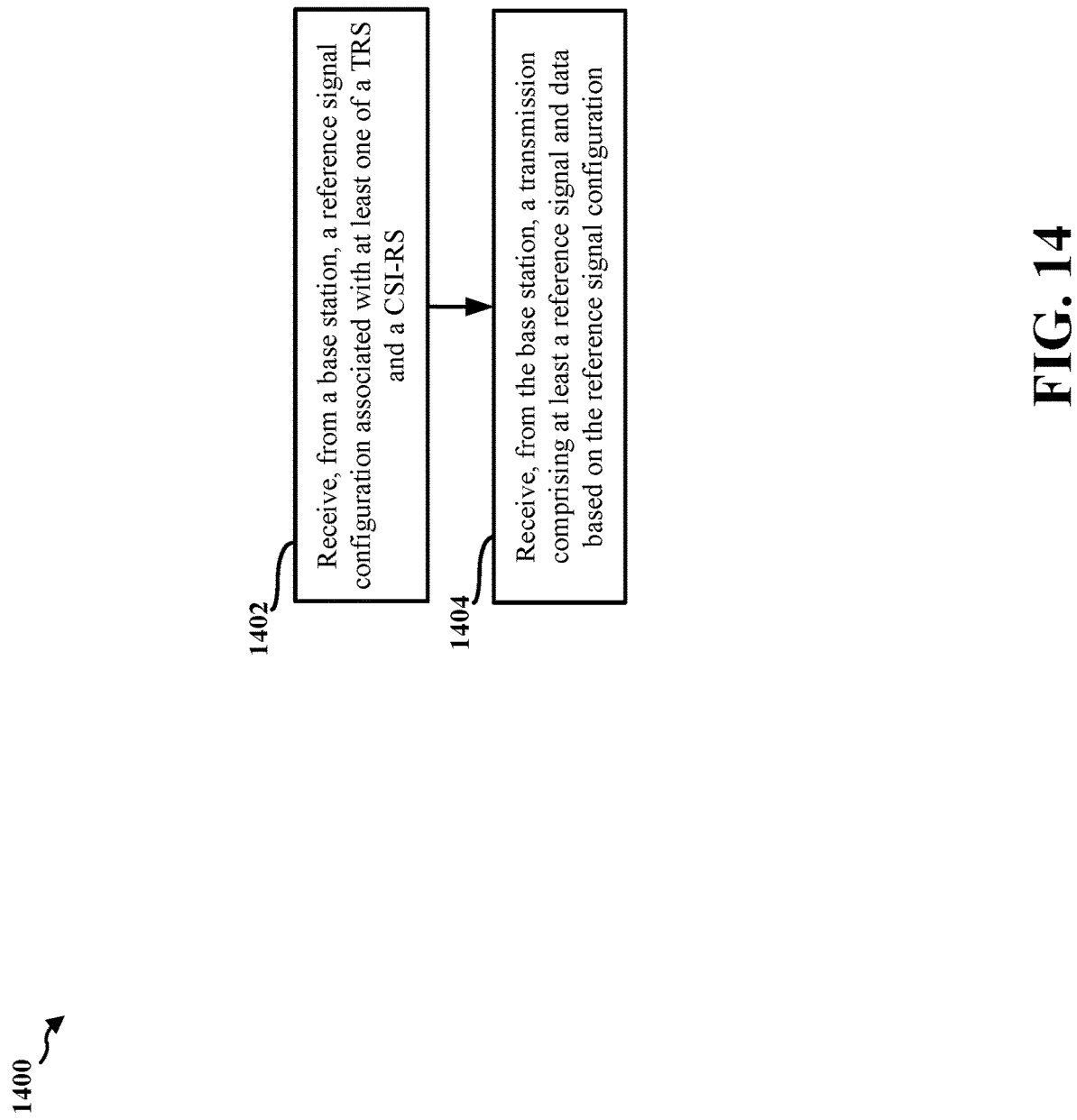
FIG. 14 is a flowchart of a method of wireless communication at a UE, in accordance with the teachings disclosed herein.

FIG. 14 is a flowchart 1400 of a method of wireless communication. The method may be performed by a UE (e.g., the UE 104, the UE 350, and/or an apparatus 1602 of FIG. 16). The method may facilitate improving cell coverage by enabling a UE to receive a reference signal and data of a transmission.

At 1402, the UE receives, from a base station, a reference signal configuration associated with at least one of a TRS and a CSI-RS, as described in connection with the reference signal configuration 1020 of FIG. 10. The reference signal configuration may comprise a symbol-level rate matching configuration, a precoder configuration, or a guard tone configuration. In some examples, the UE may receive the reference signal configuration via system information. In some examples, the UE may receive the reference signal configuration via RRC signaling. In some examples, the UE may receive the reference signal configuration via a MAC-CE. The receiving of the reference signal configuration, at 1402, may be performed by a configuration reception component 1640 of the apparatus 1602 of FIG. 16.

At 1404, the UE receives, from the base station, a transmission comprising at least a reference signal and data based on the reference signal configuration, as described in connection with the downlink transmission 1040 including the reference signal 1042 and the data 1044 of FIG. 10. The receiving of the transmission, at 1404, may be performed by a transmission reception component 1642 of the apparatus 1602 of FIG. 16.

Figure 15:
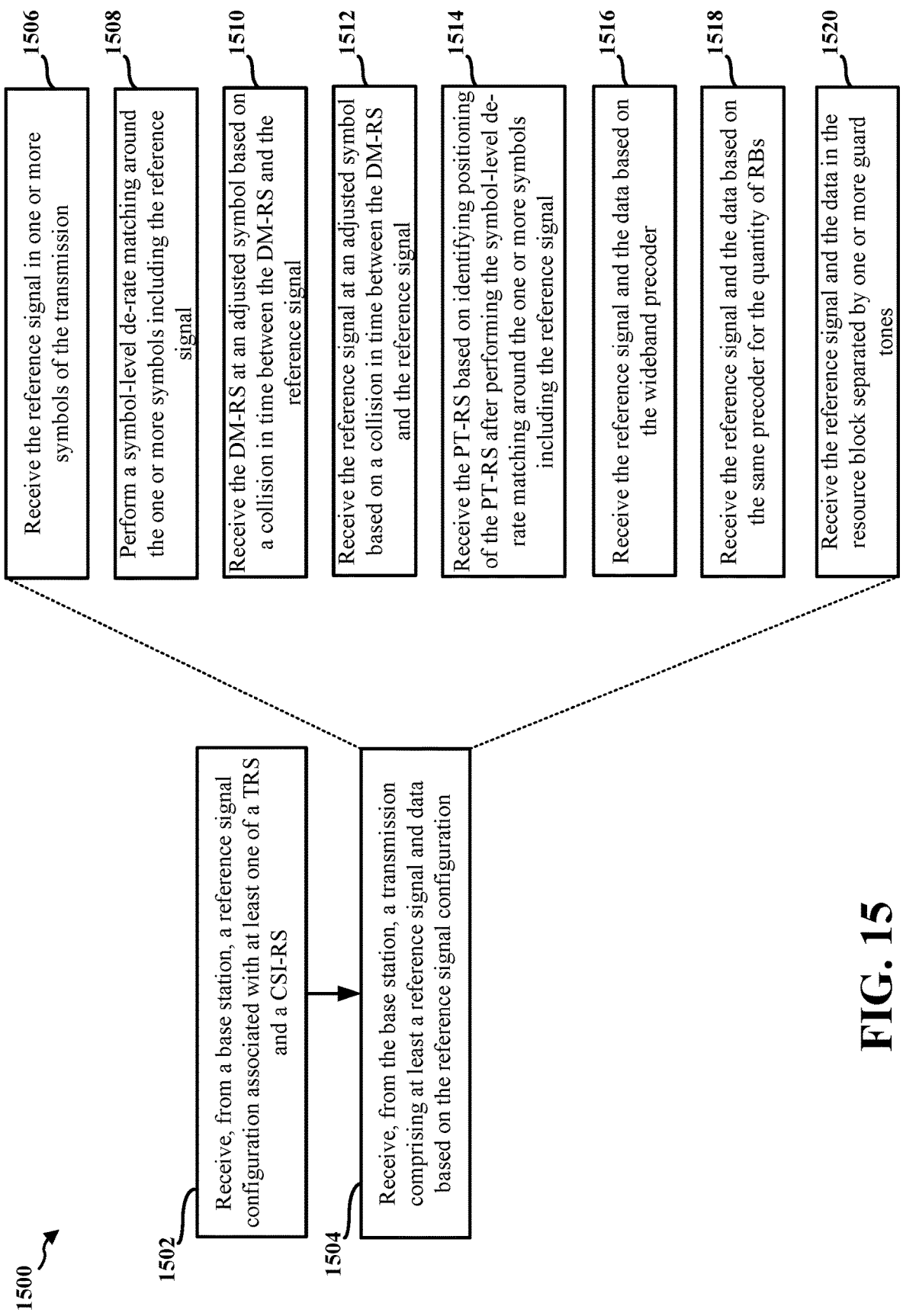
FIG. 15 is a flowchart of a method of wireless communication at a UE, in accordance with the teachings disclosed herein.

FIG. 15 is a flowchart 1500 of a method of wireless communication. The method may be performed by a UE (e.g., the UE 104, the UE 350, and/or an apparatus 1602 of FIG. 16). The method may facilitate improving cell coverage by enabling a UE to receive a reference signal and data of a transmission.

At 1502, the UE receives, from a base station, a reference signal configuration associated with at least one of a TRS and a CSI-RS, as described in connection with the reference signal configuration 1020 of FIG. 10. The reference signal configuration may comprise a symbol-level rate matching configuration, a precoder configuration, or a guard tone configuration. In some examples, the UE may receive the reference signal configuration via system information. In some examples, the UE may receive the reference signal configuration via RRC signaling. In some examples, the UE may receive the reference signal configuration via a MAC-CE. The receiving of the reference signal configuration, at 1502, may be performed by a configuration reception component 1640 of the apparatus 1602 of FIG. 16.

At 1504, the UE receives, from the base station, a transmission comprising at least a reference signal and data based on the reference signal configuration, as described in connection with the downlink transmission 1040 including the reference signal 1042 and the data 1044 of FIG. 10. The receiving of the transmission, at 1504, may be performed by a transmission reception component 1642 of the apparatus 1602 of FIG. 16.

In some examples, the reference signal configuration includes the symbol-level rate matching configuration, as described in connection with the symbol-level rate matching configuration 1022 of FIG. 10. In some such examples, receiving the transmission may include the UE, at 1506, receiving the reference signal in one or more symbols of the transmission, as described in connection with the example slot 900 of FIG. 9. For example, the UE may receive the TRS in the symbols 4 and 8 of the slot 900 of FIG. 9. The receiving of the reference signal in one or more symbols, at 1506, may be performed by reference signal reception component 1644 of the apparatus 1602 of FIG. 16.

At 1508, the UE performs a symbol-level de-rate matching around the one or more symbols including the reference signal, as described in connection with the example slot 900 of FIG. 9. For example, the UE may perform the symbol-level de-rate matching around the symbols 4 and 8 of the slot 900 of FIG. 9 including the TRS. The performing of the symbol-level de-rate matching, at 1508, may be performed by a de-rate matching component 1646 of the apparatus 1602 of FIG. 16.

In some examples, the transmission may also include a DM-RS, as described in connection with the DM-RS 1046 of FIG. 10 and the examples of FIGS. 11A, 11B, and 11C. In some such examples, the UE, at 1510, may receive the DM-RS at an adjusted symbol based on a collision in time between the DM-RS and the reference signal, as described in connection with 1080 of FIG. 10 and the second example slot 1120 of FIG. 11B. In some examples, the adjusted symbol may occur after a colliding symbol. For example, in the first example slot 1100 of FIG. 11A, the symbols 4 and 8 are colliding symbols as the DM-RS symbols and the TRS symbols are overlapping in time. In the example of FIG. 11B, the DM-RS symbols are moved to a symbol occurring after the colliding symbols (e.g., moved to the symbols 5 and 9 of the second example slot 1120). The receiving of the DM-RS at the adjusted symbol, at 1510, may be performed by a DM-RS component 1648 of the apparatus 1602 of FIG. 16.

In some examples, the UE may receive, at 1512, the reference signal in an adjusted symbol based on a collision in time between the DM-RS and the reference signal, as described in connection with 1080 of FIG. 10 and the third example slot 1140 of FIG. 11C. For example, the adjusted symbol may occur after a colliding symbol. For example, in the first example slot 1100 of FIG. 11A, the symbols 4 and 8 are colliding symbols as the DM-RS symbols and the TRS symbols are overlapping in time. In the example of FIG. 11C, the TRS symbols are moved to a symbol occurring after the colliding symbols (e.g., moved to the symbols 5 and 9 of the third example slot 1140). The receiving of the reference signal at the adjusted symbol, at 1512, may be performed by the reference signal reception component 1644 of the apparatus 1602 of FIG. 16.

In some examples, the transmission may also include a PT-RS, as described in connection with the PT-RS 1048 of FIG. 10 and the examples of FIGS. 12A and 12B. In some such examples, the UE, at 1514, may receive the PT-RS based on identifying positioning of the PT-RS after performing the symbol-level de-rate matching around the one or more symbols including the reference signal, as described in connection with 1090 of FIG. 10 and the second example slot 1220 of FIG. 12B. For example, the positioning of the PT-RS may be based on a time-domain start symbol and a density relative to the data received in the transmission, as described in connection with the second example slot 1220 of FIG. 12B. The receiving of the PT-RS based on identifying positioning of the PT-RS, at 1514, may be performed by a PT-RS component 1650 of the apparatus 1602 of FIG. 16.

In some examples, the reference signal configuration includes the precoder configuration, as described in connection with the precoder configuration 1024 of FIG. 10. For example, the precoder configuration may indicate that the reference signal and the data are both associated with a wideband precoder. In some such examples, receiving the transmission may include the UE, at 1516, receiving the reference signal and the data based on the wideband precoder, as described in connection with 1050 and 1070 of FIG. 10. The receiving of the reference signal and the data based on the wideband precoder, at 1516, may be performed by a wideband precoder component 1652 of the apparatus 1602 of FIG. 16.

In some examples, the precoder configuration may indicate a quantity of RBs of the transmission that are associated with a same precoder. In some such examples, receiving the transmission may include the UE, at 1518, receiving the reference signal and the data based on the same precoder for the quantity of RBs, as described in connection with 1050 and 1070 of FIG. 10. The receiving of the reference signal and the data based on the same precoder for the quantity of RBs, at 1518, may be performed by a bundled RB component 1654 of the apparatus 1602 of FIG. 16. In some examples, a sample duration associated with the quantity of RBs may satisfy a timing threshold. In some examples, the sample duration may be calculated based on the quantity of RBs and a subcarrier spacing associated with the transmission. For example, Equation 1 (above) may be used to calculate the sample duration.

In some examples, the reference signal configuration includes the guard tone configuration indicating a presence of guard tones, as described in connection with the guard tone configuration 1026 of FIG. 10. For example, the transmission may include at least one resource block including reference signal tones, data tones, and guard tones. In some such examples, receiving the transmission may include the UE, at 1520, receiving the reference signal and the data in the resource block separated by one or more guard tones, as described in connection with the example resource block 1300 of FIG. 13. The receiving of the reference signal and the data in the resource block separated by one or more guard tones, at 1520, may be performed by a guard tone component 1656 of the apparatus 1602 of FIG. 16.

In some examples, the guard tones may be positioned adjacent to the reference signal tones of the resource block between the reference signal and the data. In some examples, the reference signal tones may comprise TRS tones. In some examples, the reference signal tones may comprise CSI-RS tones. In some examples, the reference signal tones may be associated with a wideband precoder and the data tones may be associated with a subband precoder.

Figure 16:
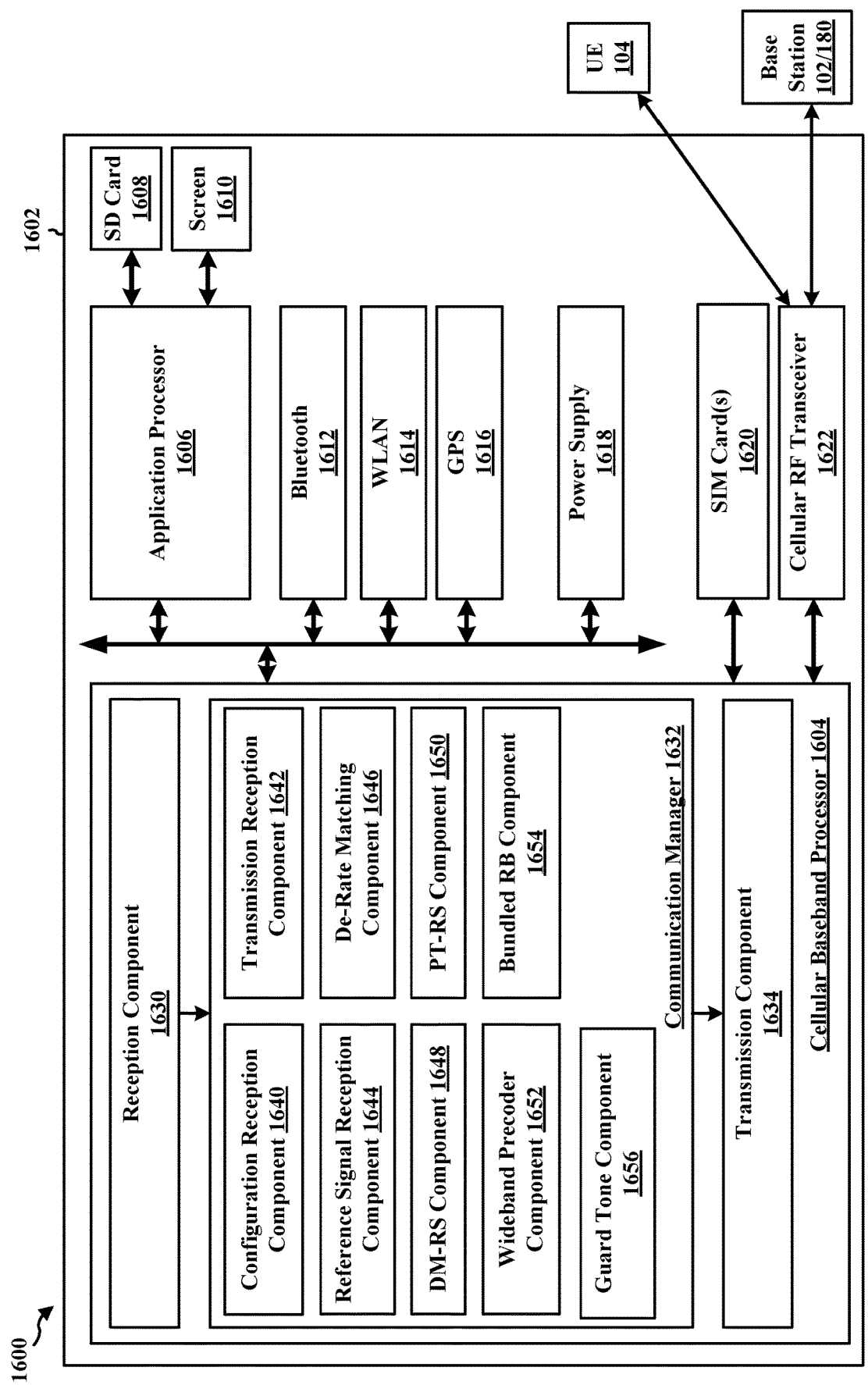
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or base station 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire UE (e.g., see the UE 350 of FIG. 3) and include the additional modules of the apparatus 1602.

The communication manager 1632 includes a configuration reception component 1640 that is configured to receive, from a base station, a reference signal configuration associated with at least one of a TRS and a CSI-RS, for example, as described in connection with 1402 of FIG. 14 and/or 1502 of FIG. 15.

The communication manager 1632 also includes a transmission reception component 1642 that is configured to receive, from the base station, a transmission comprising at least a reference signal and data based on the reference signal configuration, for example, as described in connection with 1404 of FIG. 14 and/or 1504 of FIG. 15.

The communication manager 1632 also includes a reference signal reception component 1644 that is configured to receive the reference signal in one or more symbols of the transmission, for example, as described in connection with 1506 of FIG. 15. The example reference signal reception component 1644 may also be configured to receive the reference signal at an adjusted symbol based on a collision in time between the DM-RS and the reference signal, for example, as described in connection with 1512 of FIG. 15.

The communication manager 1632 also includes a de-rate matching component 1646 that is configured to perform a symbol-level de-rate matching around the one or more symbols including the reference signal, for example, as described in connection with 1508 of FIG. 15.

The communication manager 1632 also includes a DM-RS component 1648 that is configured to receive the DM-RS at an adjusted symbol based on a collision in time between the DM-RS and the reference signal, for example, as described in connection with 1510 of FIG. 15.

The communication manager 1632 also includes a PT-RS component 1650 that is configured to receive the PT-RS based on identifying positioning of the PT-RS after performing the symbol-level de-rate matching around the one or more symbols including the reference signal, for example, as described in connection with 1514 of FIG. 15.

The communication manager 1632 also includes a wideband precoder component 1652 that is configured to receive the reference signal and the data based on the wideband precoder, for example, as described in connection with 1516 of FIG. 15.

The communication manager 1632 also includes a bundled RB component 1654 that is configured to receive the reference signal and the data based on the same precoder for the quantity of RBs, for example, as described in connection with 1518 of FIG. 15.

The communication manager 1632 also includes a guard tone component 1656 that is configured to receive the reference signal and the data in the resource block separated by one or more guard tones, for example, as described in connection with 1520 of FIG. 15.

The apparatus may include additional components that perform each of the blocks of the algorithm in the flowcharts of FIG. 14 and/or 15. As such, each block in the flowcharts of FIG. 14 and/or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for receiving, from a base station, a reference signal configuration associated with at least one of a TRS and a channel state information reference signal CSI-RS, the reference signal configuration comprising a symbol-level rate matching configuration, a precoder configuration, or a guard tone configuration. The example apparatus 1602 also includes means for receiving, from the base station, a transmission comprising at least a reference signal and data based on the reference signal configuration.

In another configuration, the example apparatus 1602 also includes means for receiving the reference signal in one or more symbols of the transmission. The example apparatus 1602 also includes means for performing a symbol-level de-rate matching around the one or more symbols including the reference signal.

In another configuration, the example apparatus 1602 also includes means for receiving the DM-RS at an adjusted symbol based on a collision in time between the DM-RS and the reference signal.

In another configuration, the example apparatus 1602 also includes means for receiving the reference signal in an adjusted symbol based on a collision in time between the DM-RS and the reference signal.

In another configuration, the example apparatus 1602 also includes means for receiving the PT-RS based on identifying positioning of the PT-RS after performing the symbol-level de-rate matching around the one or more symbols including the reference signal.

In another configuration, the example apparatus 1602 also includes means for receiving the reference signal and the data based on the wideband precoder.

In another configuration, the example apparatus 1602 also includes means for receiving the reference signal and the data based on the same precoder for the quantity of RBs.

In another configuration, the example apparatus 1602 also includes means for receiving the reference signal and the data in the resource block separated by one or more guard tones.

The means may be one or more of the components of the apparatus 1602 configured to perform the functions recited by the means. As described supra, the apparatus 1602 may include the TX processor 368, the RX processor 356, and the controller/processor 359. As such, in one configuration, the means may be the TX processor 368, the RX processor 356, and the controller/processor 359 configured to perform the functions recited by the means.

Figure 17:
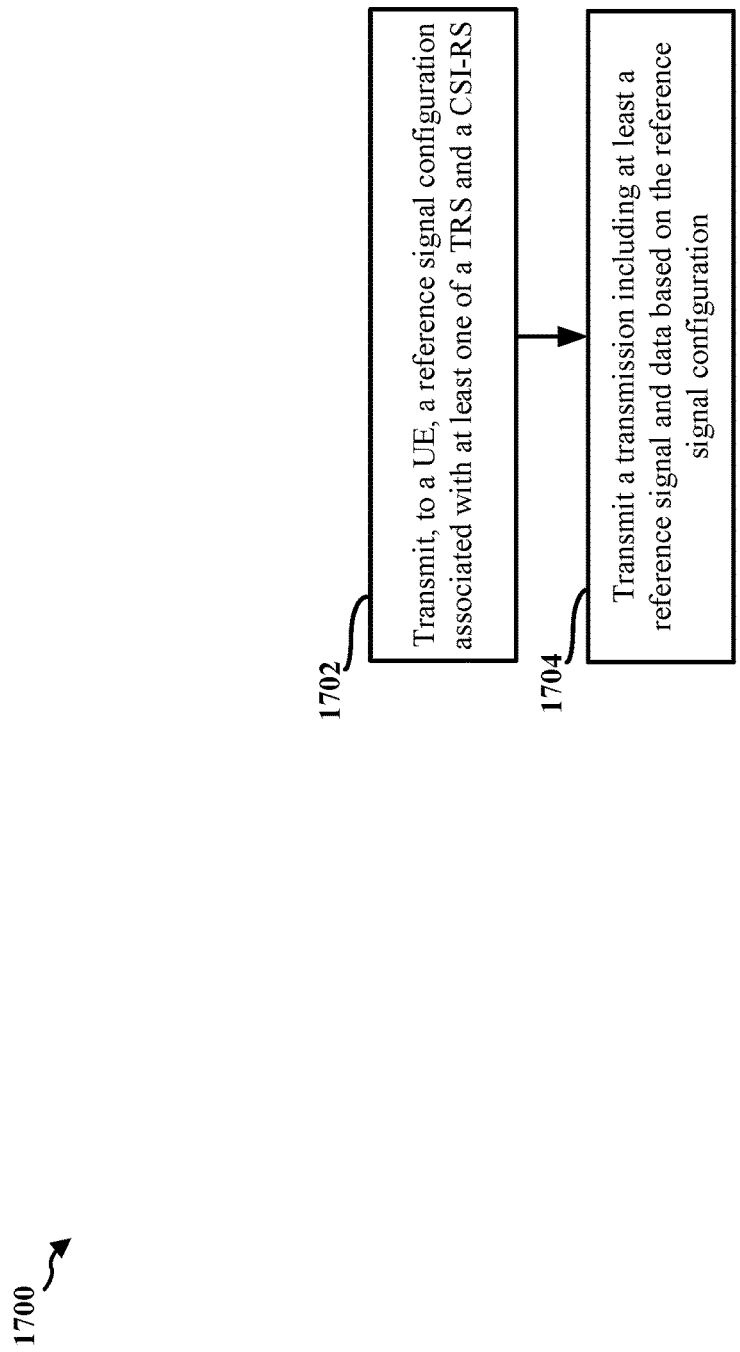
FIG. 17 is a flowchart of a method of wireless communication at a base station, in accordance with the teachings disclosed herein.

FIG. 17 is a flowchart 1700 of a method of wireless communication. The method may be performed by a base station (e.g., the base station 102/180, the base station 310, and/or an apparatus 1902 of FIG. 19). The method may facilitate improving cell coverage by enabling a UE to receive a reference signal and data of a transmission.

At 1702, the base station transmits, to a UE, a reference signal configuration associated with at least one of a TRS and a CSI-RS, as described in connection with the reference signal configuration 1020 of FIG. 10. The transmitting of the reference signal configuration, at 1702, may be performed by a configuration component 1940 of the apparatus 1902 of FIG. 19. The reference signal configuration may comprise a symbol-level rate matching configuration, a precoder configuration, or a guard tone configuration. In some examples, the base station may transmit the reference signal configuration via system information. In some examples, the base station may transmit the reference signal configuration via RRC signaling. In some examples, the base station may transmit the reference signal configuration via a MAC-CE.

At 1704, the base station transmits a transmission including at least a reference signal and data based on the reference signal configuration, as described in connection with the downlink transmission 1040 including the reference signal 1042 and the data 1044 of FIG. 10. The transmitting of the transmission including at least the reference signal and the data based on the reference signal configuration, at 1704, may be performed by reference signal and data component 1942 of the apparatus 1902 of FIG. 19.

Figure 18:
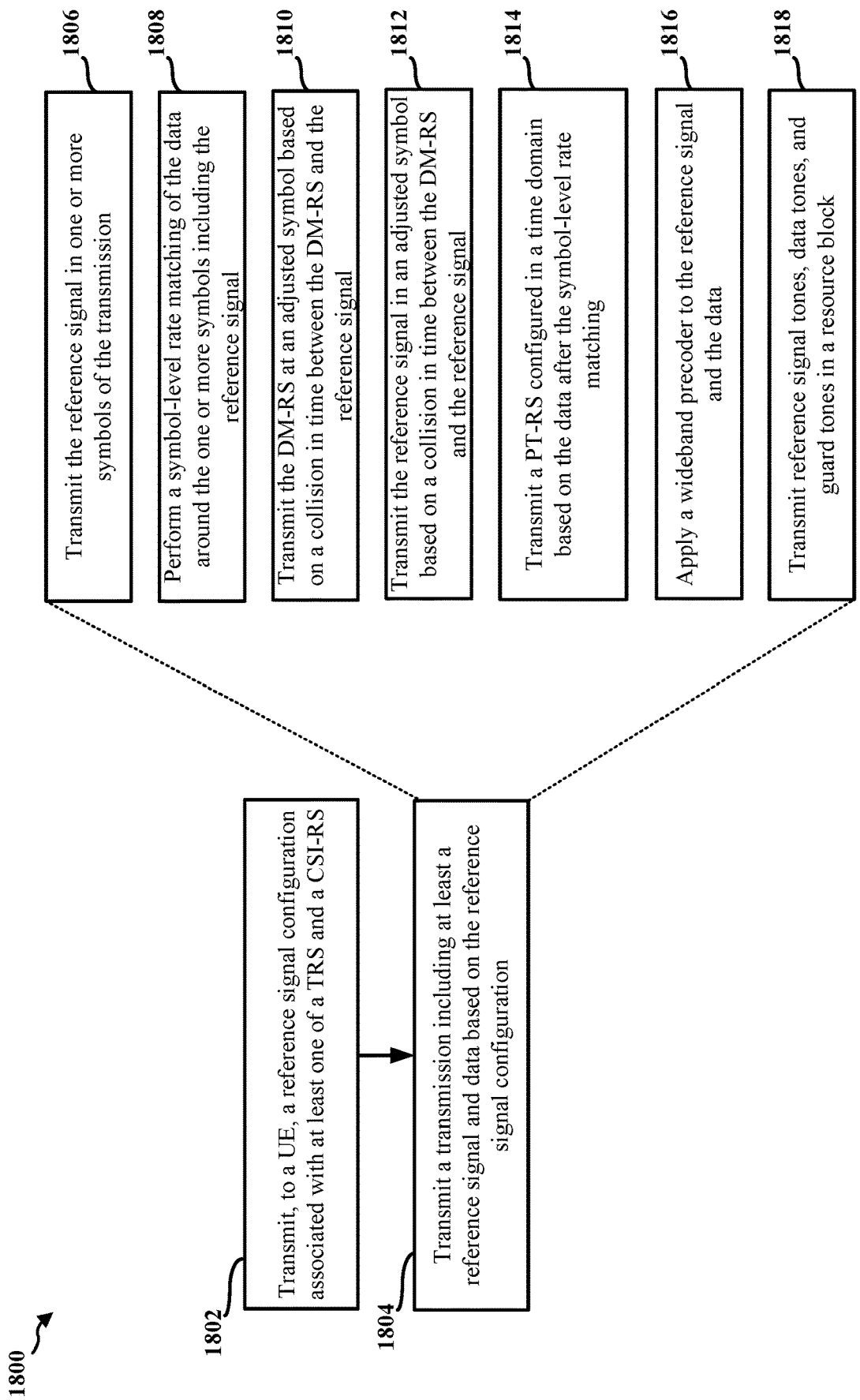
FIG. 18 is a flowchart of a method of wireless communication at a base station, in accordance with the teachings disclosed herein.

FIG. 18 is a flowchart 1800 of a method of wireless communication. The method may be performed by a base station (e.g., the base station 102/180, the base station 310, and/or an apparatus 1902 of FIG. 19). The method may facilitate improving cell coverage by enabling a UE to receive a reference signal and data of a transmission.

At 1802, the base station transmits, to a UE, a reference signal configuration associated with at least one of a TRS and a CSI-RS, as described in connection with the reference signal configuration 1020 of FIG. 10. The transmitting of the reference signal configuration, at 1802, may be performed by a configuration component 1940 of the apparatus 1902 of FIG. 19. The reference signal configuration may comprise a symbol-level rate matching configuration, a precoder configuration, or a guard tone configuration. In some examples, the base station may transmit the reference signal configuration via system information. In some examples, the base station may transmit the reference signal configuration via RRC signaling. In some examples, the base station may transmit the reference signal configuration via a MAC-CE.

At 1804, the base station transmits a transmission including at least a reference signal and data based on the reference signal configuration, as described in connection with the downlink transmission 1040 including the reference signal 1042 and the data 1044 of FIG. 10. The transmitting of the transmission including at least the reference signal and the data based on the reference signal configuration, at 1804, may be performed by reference signal and data component 1942 of the apparatus 1902 of FIG. 19.

In some examples, the reference signal configuration includes the symbol-level rate matching configuration, as described in connection with the symbol-level rate matching configuration 1022 of FIG. 10. In some such examples, at 1806, the base station may transmit the reference signal in one or more symbols of the transmission, as described in connection with the example slot 900 of FIG. 9. The transmitting of the reference signal in one or more symbols, at 1806, may be performed by a reference signal component 1944 of the apparatus 1902 of FIG. 19. For example, the base station may transmit the reference signal in the symbols 4 and 8 of the slot 900 of FIG. 9.

At 1808, the base station may perform a symbol-level rate matching of the data around the one or more symbols including the reference signal, as described in connection with the example slot 900 of FIG. 9. The performing of the symbol-level rate matching, at 1808, may be performed by a rate matching component 1946 of the apparatus 1902 of FIG. 19. For example, the base station may perform the symbol-level rate matching of the data around the symbols 4 and 8 of the slot 900 of FIG. 9 including the TRS.

In some examples, the base station may transmit a DM-RS, as described in connection with the DM-RS 1046 of FIG. 10 and the examples of FIGS. 11A, 11B, and 11C. For example, at 1810, the base station may transmit a DM-RS at an adjusted symbol based on a collision in time between the DM-RS and the reference signal, as described in connection with 1080 of FIG. 10 and the second example slot 1120 of FIG. 11B. The transmitting of the DM-RS at the adjusted symbol, at 1810, may be performed by a DM-RS component 1948 of the apparatus 1902 of FIG. 19. In some examples, the adjusted symbol may occur after a colliding symbol. For example, in the first example slot 1100 of FIG. 11A, the symbols 4 and 8 are colliding symbols as the DM-RS symbols and the TRS symbols are overlapping in time. In the example of FIG. 11B, the DM-RS symbols are moved to a symbol occurring after the colliding symbols (e.g., moved to the symbols 5 and 9 of the second example slot 1120).

In some examples, at 1812, the base station may transmit the reference signal in an adjusted symbol based on a collision in time between the DM-RS and the reference signal, as described in connection with 1080 of FIG. 10 and the third example slot 1140 of FIG. 11C. The transmitting of the reference signal at the adjusted symbol, at 1812, may be performed by the reference signal component 1944 of the apparatus 1902 of FIG. 19. In some examples, the adjusted symbol may occur after a colliding symbol. For example, in the first example slot 1100 of FIG. 11A, the symbols 4 and 8 are colliding symbols as the DM-RS symbols and the TRS symbols are overlapping in time. In the example of FIG. 11C, the TRS symbols are moved to a symbol occurring after the colliding symbols (e.g., moved to the symbols 5 and 9 of the third example slot 1140).

In some examples, the base station may transmit a PT-RS, as described in connection with the PT-RS 1048 of FIG. 10 and the examples of FIGS. 12A and 12B. For example, at 1814, the base station may transmit a PT-RS configured in a time-domain based on the data after the symbol-level rate matching, as described in connection with 1090 of FIG. 10 and the second example slot 1220 of FIG. 12B. The transmitting of the PT-RS configured in the time-domain, at 1814, may be performed by a PT-RS component 1950 of the apparatus 1902 of FIG. 19. In some examples, the positioning of the PT-RS may be based on a time-domain start symbol and a density relative to the data in the transmission, as described in connection with the second example slot 1220 of FIG. 12B.

In some examples, the reference signal configuration includes the precoder configuration, as described in connection with the precoder configuration 1024 of FIG. 10. For example, at 1816, the base station may apply a wideband precoder to the reference signal and the data, as described in connection with 1050 and 1070 of FIG. 10. The applying of the wideband precoder to the reference signal and the data, at 1816, may be performed by wideband precoder component 1952 of the apparatus 1902 of FIG. 19.

In some examples, the precoder configuration may indicate a quantity of RBs of the transmission that are associated with a same precoder. In some examples, a sample duration associated with the quantity of RBs may satisfy a timing threshold. In some examples, the sample duration may be calculated based on the quantity of RBs and a subcarrier spacing associated with the transmission. For example, Equation 1 (above) may be used to calculate the sample duration.

In some examples, the reference signal configuration includes the guard tone configuration indicating a presence of guard tones, as described in connection with the guard tone configuration 1026 of FIG. 10. For example, at 1818, the base station may transmit reference signal tones, data tones, and guard tones in a resource block, as described in connection with the example resource block 1300 of FIG. 13. The transmitting of the reference signal tones, the data tones, and the guard tones in the resource block, at 1818, may be performed by a guard tones component 1954 of the apparatus 1902 of FIG. 19.

In some examples, the guard tones may be positioned adjacent to the reference signal tones of the resource block between the reference signal and the data. In some examples, the reference signal tones may comprise TRS tones. In some examples, the reference signal tones may comprise CSI-RS tones. In some examples, the reference signal tones may be associated with a wideband precoder and the data tones may be associated with a subband precoder.

Figure 19:
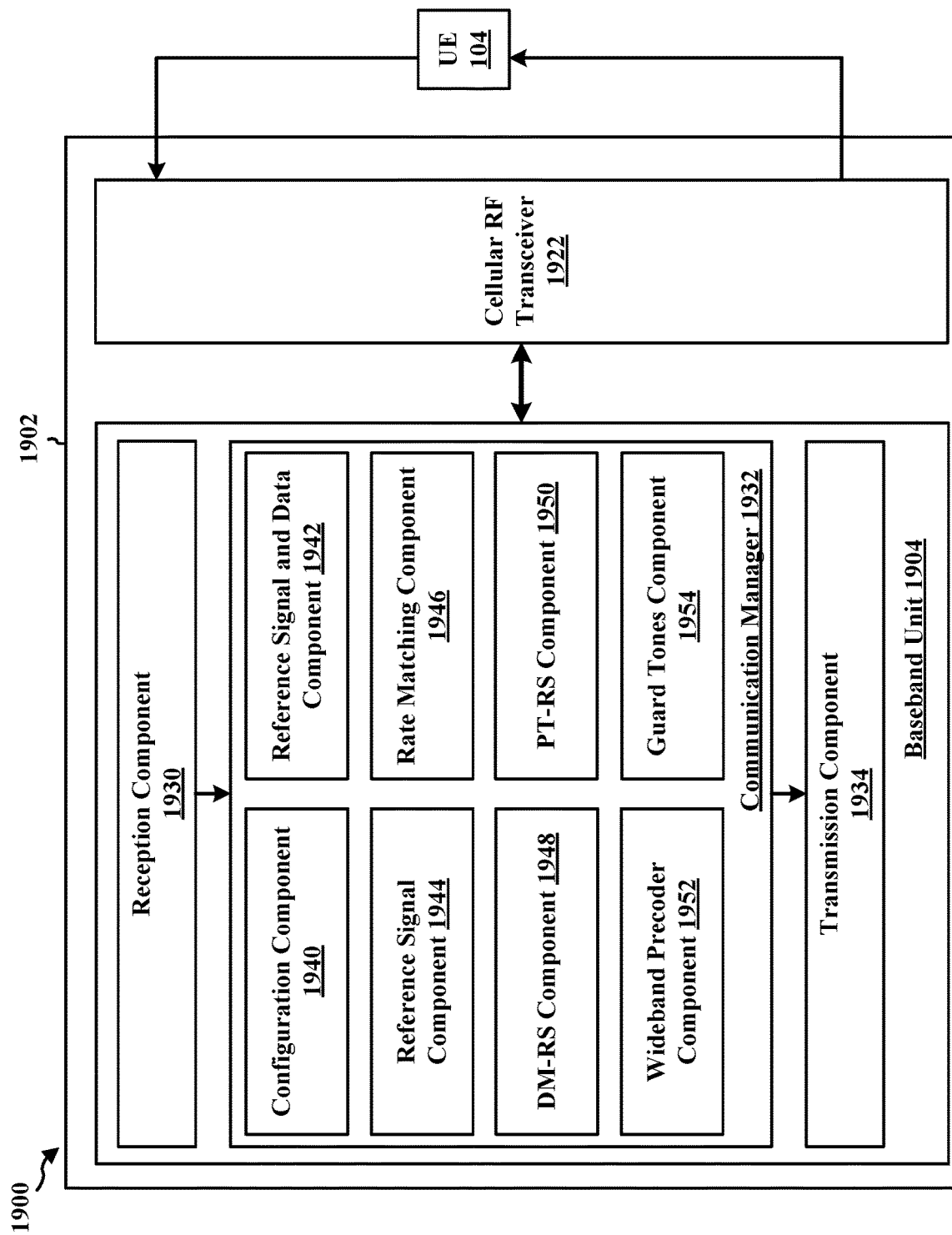
FIG. 19 is a diagram illustrating an example of a hardware implementation for an example apparatus, in accordance with the teachings disclosed herein.

FIG. 19 is a diagram 1900 illustrating an example of a hardware implementation for an apparatus 1902. The apparatus 1902 may be a base station, a component of a base station, or may implement base station functionality. In some aspects, the apparatus 1902 may include a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes a configuration component 1940 that is configured to transmit, to a UE, a reference signal configuration associated with at least one of a TRS and a CSI-RS, for example, as described in connection with 1702 of FIG. 17 and/or 1802 of FIG. 18.

The communication manager 1932 also includes a reference signal and data component 1942 that is configured to transmit a transmission including at least a reference signal and data based on the reference signal configuration, for example, as described in connection with 1704 of FIG. 17 and/or 1804 of FIG. 18.

The communication manager 1932 also includes a reference signal component 1944 that is configured to transmit the reference signal in one or more symbols of the transmission, for example, as described in connection with 1806 of FIG. 18. The example reference signal component 1944 may also be configured to transmit the reference signal in an adjusted symbol based on a collision in time between the DM-RS and the reference signal, for example, as described in connection with 1812 of FIG. 18.

The communication manager 1932 also includes a rate matching component 1946 that is configured to perform a symbol-level rate matching of the data around the one or more symbols including the reference signal, for example, as described in connection with 1808 of FIG. 18.

The communication manager 1932 also includes a DM-RS component 1948 that is configured to transmit the DM-RS at an adjusted symbol based on a collision in time between the DM-RS and the reference signal, for example, as described in connection with 1810 of FIG. 18.

The communication manager 1932 also includes a PT-RS component 1950 that is configured to transmit a PT-RS configured in a time-domain based on the data after the symbol-level rate matching, for example, as described in connection with 1814 of FIG. 18.

The communication manager 1932 also includes a wideband precoder component 1952 that is configured to apply a wideband precoder to the reference signal and the data, for example, as described in connection with 1816 of FIG. 18.

The communication manager 1932 also includes a guard tones component 1954 that is configured to transmit reference signal tones, data tones, and guard tones in a resource block, for example, as described in connection with 1818 of FIG. 18.

The apparatus may include additional components that perform each of the blocks of the algorithm in the flowcharts of FIG. 17 and/or 18. As such, each block in the flowcharts of FIG. 17 and/or 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for transmitting, to a UE, a reference signal configuration associated with at least one of a TRS and a CSI-RS, the reference signal configuration comprising a symbol-level rate matching configuration, a precoder configuration, or a guard tone configuration. The example apparatus 1902 also includes means for transmitting a transmission including at least a reference signal and data based on the reference signal configuration.

In another configuration, the example apparatus 1902 also includes means for transmitting the reference signal in one or more symbols of the transmission. The example apparatus 1902 also includes means for performing a symbol-level rate matching of the data around the one or more symbols including the reference signal.

In another configuration, the example apparatus 1902 also includes means for transmitting a DM-RS at an adjusted symbol based on a collision in time between the DM-RS and the reference signal.

In another configuration, the example apparatus 1902 also includes means for transmitting the reference signal in an adjusted symbol based on a collision in time between a DM-RS and the reference signal.

In another configuration, the example apparatus 1902 also includes means for transmitting a PT-RS configured in a time-domain based on the data after the symbol-level rate matching.

In another configuration, the example apparatus 1902 also includes means for applying a wideband precoder to the reference signal and the data.

In another configuration, the example apparatus 1902 also includes means for transmitting reference signal tones, data tones, and guard tones in a resource block.

The means may be one or more of the components of the apparatus 1902 configured to perform the functions recited by the means. As described supra, the apparatus 1902 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein provide techniques for transmitting and receiving a transmission including reference signal multiplexing with data. For example, disclosed techniques enable the UE to receive the reference signal and to receive the data without the reference signal interfering with the data. In some aspects, the UE may receive a reference signal configuration that configures the UE to receive the reference signal and to receive the data of the transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from a base station, a reference signal configuration associated with at least one of a TRS and a CSI-RS, the reference signal configuration comprising a symbol level rate matching configuration, a precoder configuration, or a guard tone configuration; and receiving, from the base station, a transmission comprising at least a reference signal and data based on the reference signal configuration.

Aspect 2 is the method of aspect 1, further including that the UE receives the reference signal configuration via at least one of SI, RRC signaling, and a MAC-CE.

Aspect 3 is the method of any of aspect 1 or aspect 2, further including that the reference signal configuration includes the symbol level rate matching configuration, and wherein receiving the transmission comprises: receiving the reference signal in one or more symbols of the transmission; and performing a symbol-level de-rate matching around the one or more symbols including the reference signal.

Aspect 4 is the method of any of aspects 1 to 3, further including that the transmission further includes a DM-RS, and wherein receiving the transmission comprises: receiving the DM-RS at an adjusted symbol based on a collision in time between the DM-RS and the reference signal.

Aspect 5 is the method of any of aspects 1 to 4, further including that the adjusted symbol occurs after a colliding symbol.

Aspect 6 is the method of any of aspects 1 to 3, further including that the transmission further includes a DM-RS, and wherein receiving the transmission comprises: receiving the reference signal in an adjusted symbol based on a collision in time between the DM-RS and the reference signal.

Aspect 7 is the method of any of aspects 1 to 3, further including that the transmission further includes a PT-RS, and wherein receiving the transmission comprises: receiving the PT-RS based on identifying positioning of the PT-RS after performing the symbol-level de-rate matching around the one or more symbols including the reference signal.

Aspect 8 is the method of any of aspects 1 to 3 and 7, further including that the positioning of the PT-RS is based on a time domain start symbol and a density relative to the data received in the transmission.

Aspect 9 is the method of any of aspect 1 or aspect 2, further including that the reference signal configuration includes the precoder configuration.

Aspect 10 is the method of any of aspects 1, 2 and 9, further including that the precoder configuration indicates that the reference signal and the data are both associated with a wideband precoder, and wherein receiving the transmission comprises: receiving the reference signal and the data based on the wideband precoder.

Aspect 11 is the method of any of aspects 1, 2, and 9, further including that the precoder configuration indicates a quantity of RBs of the transmission that are associated with a same precoder, and wherein receiving the transmission comprises: receiving the reference signal and the data based on the same precoder for the quantity of RBs.

Aspect 12 is the method of any of aspects 1, 2, 9, and 11, further including that a sample duration associated with the quantity of RBs satisfies a timing threshold, the sample duration calculated based on the quantity of RBs and a subcarrier spacing associated with the transmission.

Aspect 13 is the method of any of aspect 1 or aspect 2, further including that the reference signal configuration includes the guard tone configuration indicating a presence of guard tones.

Aspect 14 is the method of any of aspects 1, 2 and 13, further including that the transmission includes at least one resource block including reference signal tones, data tones, and guard tones, and wherein receiving the transmission comprises: receiving the reference signal and the data in the resource block separated by one or more guard tones.

Aspect 15 is the method of any of aspects 1, 2, 13, and 14, further including that the guard tones are positioned adjacent to the reference signal tones of the resource block between the reference signal and the data.

Aspect 16 is the method of any of aspects 1, 2, and 13 to 15, further including that the reference signal tones comprise TRS tones.

Aspect 17 is the method of any of aspects 1, 2, and 13 to 15, further including that the reference signal tones comprise CSI-RS tones.

Aspect 18 is the method of any of aspects 1, 2, and 13 to 17, further including that the reference signal tones are associated with a wideband precoder and the data tones are associated with a subband precoder.

Aspect 19 is an apparatus for wireless communication including a memory and at least one processor coupled to a memory, the memory and the at least one processor configured to implement a method as in any of aspects 1 to 18.

Aspect 20 is an apparatus for wireless communication including means for implementing a method as in any of aspects 1 to 18.

Aspect 21 is a non-transitory computer-readable storage medium storing computer executable code, where the code, when executed, causes a processor to implement a method as in any of aspects 1 to 18.

Aspect 22 is a method of wireless communication at a base station, comprising: transmitting, to a UE, a reference signal configuration associated with at least one of a TRS and a CSI-RS, the reference signal configuration comprising a symbol level rate matching configuration, a precoder configuration, or a guard tone configuration; and transmitting a transmission including at least a reference signal and data based on the reference signal configuration.

Aspect 23 is the method of aspect 22, further including that the base station transmits the reference signal configuration via at least one of SI, RRC signaling, and a MAC-CE.

Aspect 24 is the method of any of aspect 22 or aspect 23, further including that the reference signal configuration includes the symbol level rate matching configuration, the method further comprising: transmitting the reference signal in one or more symbols of the transmission; and performing a symbol-level rate matching of the data around the one or more symbols including the reference signal.

Aspect 25 is the method of any of aspects 22 to 24, further including: transmitting a DM-RS at an adjusted symbol based on a collision in time between the DM-RS and the reference signal.

Aspect 26 is the method of any of aspects 22 to 25, further including that the adjusted symbol occurs after a colliding symbol.

Aspect 27 is the method of any of aspects 22 to 24, further including: transmitting the reference signal in an adjusted symbol based on a collision in time between a DM-RS and the reference signal.

Aspect 28 is the method of any of aspects 22 to 24, further including: transmitting a PT-RS configured in a time domain based on the data after the symbol-level rate matching.

Aspect 29 is the method of any of aspects 22 to 24 and 28, further including that the PT-RS is transmitted based on a time domain start symbol and a density relative to the data in the transmission.

Aspect 30 is the method of any of aspect 22 or aspect 23, further including that the reference signal configuration includes the precoder configuration.

Aspect 31 is the method of any of aspects 22, 23, and 30, further including: applying a wideband precoder to the reference signal and the data.

Aspect 32 is the method of any of aspects 22, 23 and 30, further including that the precoder configuration indicates a quantity of RBs of the transmission that are associated with a same precoder.

Aspect 33 is the method of any of aspects 22, 23, 30, and 32, further including that a sample duration associated with the quantity of RBs satisfies a timing threshold, the sample duration calculated based on the quantity of RBs and a subcarrier spacing associated with the transmission.

Aspect 34 is the method of any of aspect 22 or aspect 23, further including that the reference signal configuration includes the guard tone configuration indicating a presence of guard tones.

Aspect 35 is the method of any of aspects 22, 23, and 34, further including: transmitting reference signal tones, data tones, and guard tones in a resource block.

Aspect 36 is the method of any of aspects 22, 23, 34, and 35, further including that the guard tones are positioned adjacent to the reference signal tones of the resource block between the reference signal and the data.

Aspect 37 is the method of any of aspects 22, 23, and 34 to 36, further including that the reference signal tones comprise TRS tones.

Aspect 38 is the method of any of aspects 22, 23, and 34 to 36, further including that the reference signal tones comprise CSI-RS tones.

Aspect 39 is the method of any of aspects 22, 23, and 34 to 38, further including that the reference signal tones are associated with a wideband precoder and the data tones are associated with a subband precoder.

Aspect 40 is an apparatus for wireless communication including a memory and at least one processor coupled to a memory, the memory and the at least one processor configured to implement a method as in any of aspects 22 to 39.

Aspect 41 is an apparatus for wireless communication including means for implementing a method as in any of aspects 22 to 39.

Aspect 42 is a non-transitory computer-readable storage medium storing computer executable code, where the code, when executed, causes a processor to implement a method as in any of aspects 22 to 39.

What is claimed is:

1. An apparatus for wireless communication at a user equipment (UE), comprising:
    memory; and
    at least one processor coupled to the memory, the at least one processor configured to cause the UE to:
        receive, from a base station, a reference signal configuration associated with at least one of a tracking reference signal (TRS) and a channel state information reference signal (CSI-RS), the reference signal configuration comprising a precoder configuration and a guard tone configuration indicating a presence of one or more guard tones; and
        receive, from the base station, a transmission comprising at least a reference signal and data based on the reference signal configuration, wherein the transmission further includes a phase tracking reference signal (PT-RS), and wherein to receive the transmission, the at least one processor is configured to cause the UE to:
            receive the PT-RS based on positioning of the PT-RS, wherein the positioning of the PT-RS excludes one or more symbols of the transmission including the reference signal, and wherein the positioning of the PT-RS is based on a time domain start symbol and a time domain symbol spacing for the PT-RS, wherein the time domain symbol spacing does not count the one or more symbols of the transmission including the reference signal.

2. The apparatus of claim 1, wherein the at least one processor is configured to cause the UE to:
    receive the reference signal configuration via at least one of system information (SI), radio resource control (RRC) signaling, and a medium access control (MAC)-control element (MAC-CE).

3. The apparatus of claim 1, wherein the reference signal configuration further includes a symbol level rate matching configuration, and wherein to receive the transmission, the at least one processor is configured to cause the UE to:
    receive the reference signal in the one or more symbols of the transmission; and
    perform a symbol-level de-rate matching around the one or more symbols including the reference signal.

4. The apparatus of claim 3, wherein the transmission further includes a demodulation reference signal (DM-RS), and wherein to receive the transmission, the at least one processor is configured to cause the UE to:
    receive the DM-RS at an adjusted symbol based on a collision in time between the DM-RS and the reference signal, the adjusted symbol occurring after a colliding symbol.

5. The apparatus of claim 3, wherein the transmission further includes a demodulation reference signal (DM-RS), and wherein to receive the transmission, the at least one processor is configured to cause the UE to:
    receive the reference signal in an adjusted symbol based on a collision in time between the DM-RS and the reference signal.

6. The apparatus of claim 3, wherein to receive the transmission, the at least one processor is configured to cause the UE to:
    identify the positioning of the PT-RS after performing the symbol-level de-rate matching around the one or more symbols including the reference signal.

7. The apparatus of claim 1, wherein the reference signal configuration includes the precoder configuration, the precoder configuration indicating that the reference signal and the data are both associated with a wideband precoder, and wherein to receive the transmission, the at least one processor is configured to cause the UE to:
    receive the reference signal and the data based on the wideband precoder.

8. The apparatus of claim 1, wherein the reference signal configuration includes the precoder configuration, the precoder configuration indicating a quantity of resource blocks (RBs) of the transmission that are associated with a same precoder, and wherein to receive the transmission, the at least one processor is configured to cause the UE to:
    receive the reference signal and the data based on the same precoder for the quantity of RBs,
    wherein a sample duration associated with the quantity of RBs satisfies a timing threshold, the sample duration calculated based on the quantity of RBs and a subcarrier spacing associated with the transmission.

9. The apparatus of claim 1, wherein the transmission includes at least one resource block including reference signal tones, data tones, and the one or more guard tones, and wherein to receive the transmission, the at least one processor is configured to cause the UE to:
    receive the reference signal and the data in the at least one resource block separated by the one or more guard tones.

10. The apparatus of claim 9, wherein the one or more guard tones are positioned adjacent to the reference signal tones of the at least one resource block between the reference signal and the data.

11. The apparatus of claim 9, wherein the reference signal tones are associated with a wideband precoder and the data tones are associated with a subband precoder.

12. The apparatus of claim 1, further comprising a transceiver coupled to the at least one processor.

13. A method of wireless communication at a user equipment (UE), comprising:
receiving, from a base station, a reference signal configuration associated with at least one of a tracking reference signal (TRS) and a channel state information reference signal (CSI-RS), the reference signal configuration comprising a precoder configuration and a guard tone configuration indicating a presence of one or more guard tones; and
receiving, from the base station, a transmission comprising at least a reference signal and data based on the reference signal configuration, wherein the transmission further includes a phase tracking reference signal (PT-RS), and wherein receiving the transmission comprises:
receiving the PT-RS based on positioning of the PT-RS, wherein the positioning of the PT-RS excludes one or more symbols of the transmission including the reference signal, and wherein the positioning of the PT-RS is based on a time domain start symbol and a time domain symbol spacing for the PT-RS, wherein the time domain symbol spacing does not count the one or more symbols of the transmission including the reference signal.

14. The method of claim 13, wherein the UE receives the reference signal configuration via at least one of system information (SI), radio resource control (RRC) signaling, and a medium access control (MAC)-control element (MAC-CE).

15. The method of claim 13, wherein the reference signal configuration further includes a symbol level rate matching configuration, and wherein receiving the transmission comprises:
receiving the reference signal in the one or more symbols of the transmission; and
performing a symbol-level de-rate matching around the one or more symbols including the reference signal.

16. The method of claim 13, wherein the reference signal configuration includes the precoder configuration, the precoder configuration indicating that the reference signal and the data are both associated with a wideband precoder, and wherein receiving the transmission comprises:
receiving the reference signal and the data based on the wideband precoder.

17. The method of claim 13, wherein the reference signal configuration includes the precoder configuration, the precoder configuration indicating a quantity of resource blocks (RBs) of the transmission that are associated with a same precoder, and wherein receiving the transmission comprises:
receiving the reference signal and the data based on the same precoder for the quantity of RBs,
wherein a sample duration associated with the quantity of RBs satisfies a timing threshold, the sample duration calculated based on the quantity of RBs and a subcarrier spacing associated with the transmission.

18. The method of claim 13, wherein the transmission includes at least one resource block including reference signal tones, data tones, and the one or more guard tones, and wherein receiving the transmission comprises:
receiving the reference signal and the data in the at least one resource block separated by the one or more guard tones.

19. An apparatus for wireless communication at a base station, comprising:
memory; and
at least one processor coupled to the memory, the at least one processor configured to cause the base station to:
transmit, to a user equipment (UE), a reference signal configuration associated with at least one of a tracking reference signal (TRS) and a channel state information reference signal (CSI-RS), the reference signal configuration comprising a precoder configuration and a guard tone configuration indicating a presence of one or more guard tones; and
transmit a transmission including at least a reference signal and data based on the reference signal configuration, wherein the transmission further includes a phase tracking reference signal (PT-RS), and wherein to transmit the transmission, the at least one processor is configured to cause the base station to:
transmit the PT-RS based on positioning of the PT-RS, wherein the positioning of the PT-RS excludes one or more symbols of the transmission including the reference signal, and wherein the positioning of the PT-RS is based on a time domain start symbol and a time domain symbol spacing for the PT-RS, wherein the time domain symbol spacing does not count the one or more symbols of the transmission including the reference signal.

20. The apparatus of claim 19, wherein the at least one processor configured to cause the base station to:
transmit the reference signal configuration via at least one of system information (SI), radio resource control (RRC) signaling, and a medium access control (MAC)-control element (MAC-CE).

21. The apparatus of claim 19, wherein the reference signal configuration further includes a symbol level rate matching configuration, the at least one processor further configured to cause the base station to:
transmit the reference signal in the one or more symbols of the transmission; and
perform a symbol-level rate matching of the data around the one or more symbols including the reference signal.

22. The apparatus of claim 19, wherein the reference signal configuration includes the precoder configuration, the at least one processor further configured to cause the base station to:
applying a wideband precoder to the reference signal and the data.

23. The apparatus of claim 19, wherein the reference signal configuration includes the precoder configuration, the precoder configuration indicating a quantity of resource blocks (RBs) of the transmission that are associated with a same precoder, and a sample duration associated with the quantity of RBs satisfies a timing threshold, the sample duration calculated based on the quantity of RBs and a subcarrier spacing associated with the transmission.

24. The apparatus of claim 19, wherein the at least one processor further configured to cause the base station to:
transmit reference signal tones, data tones, and the one or more guard tones in a resource block.

25. A method of wireless communication at a base station, comprising:

transmitting, to a user equipment (UE), a reference signal configuration associated with at least one of a tracking reference signal (TRS) and a channel state information reference signal (CSI-RS), the reference signal configuration comprising a precoder configuration and a guard tone configuration indicating a presence of one or more guard tones; and transmitting a transmission including at least a reference signal and data based on the reference signal configuration, wherein the transmission further includes a phase tracking reference signal (PT-RS), and wherein transmitting the transmission comprises:

transmitting the PT-RS based on positioning of the PT-RS, wherein the positioning of the PT-RS excludes one or more symbols of the transmission including the reference signal, and wherein the positioning of the PT-RS is based on a time domain start symbol and a time domain symbol spacing for the PT-RS, wherein the time domain symbol spacing does not count the one or more symbols of the transmission including the reference signal.

26. The method of claim 25, wherein the base station transmits the reference signal configuration via at least one of system information (SI), radio resource control (RRC) signaling, and a medium access control (MAC)-control element (MAC-CE).

27. The method of claim 25, wherein the reference signal configuration further includes a symbol level rate matching configuration, the method further comprising:

transmitting the reference signal in the one or more symbols of the transmission; and performing a symbol-level rate matching of the data around the one or more symbols including the reference signal.

28. The method of claim 25, wherein the reference signal configuration includes the precoder configuration, the method further comprising:

applying a wideband precoder to the reference signal and the data.

29. The method of claim 25, wherein the reference signal configuration includes the precoder configuration, the precoder configuration indicating a quantity of resource blocks (RBs) of the transmission that are associated with a same precoder, and a sample duration associated with the quantity of RBs satisfies a timing threshold, the sample duration calculated based on the quantity of RBs and a subcarrier spacing associated with the transmission.

30. The method of claim 25, further comprising:

transmitting reference signal tones, data tones, and the one or more guard tones in a resource block.

* * * * *